US012228195B2

(12) United States Patent
Steinberger et al.

(10) Patent No.: US 12,228,195 B2
(45) Date of Patent: Feb. 18, 2025

(54) DRIVELINE FOR ELECTRIFIED VEHICLE

(71) Applicant: Oshkosh Corporation, Oshkosh, WI (US)

(72) Inventors: David J. Steinberger, Oshkosh, WI (US); Jon J. Morrow, Neenah, WI (US); Andrew J. Kotloski, Oshkosh, WI (US); Eric E. Braun, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 30 days.

(21) Appl. No.: 18/427,247

(22) Filed: Jan. 30, 2024

(65) Prior Publication Data
US 2024/0167541 A1 May 23, 2024

Related U.S. Application Data

(63) Continuation of application No. 17/156,122, filed on Jan. 22, 2021, which is a continuation-in-part of (Continued)

(51) Int. Cl.
*F16H 3/72* (2006.01)
*B60K 6/365* (2007.10)
(Continued)

(52) U.S. Cl.
CPC ............. *F16H 3/727* (2013.01); *B60K 6/365* (2013.01); *B60K 6/387* (2013.01); *B60K 6/442* (2013.01);
(Continued)

(58) Field of Classification Search
CPC ........ F16H 3/727; F16H 3/728; F16H 37/084; F16H 2037/0866; B60K 6/365; B60K 6/387; B60K 6/442; B60K 6/445
See application file for complete search history.

(56) References Cited

U.S. PATENT DOCUMENTS 1,951,089 A 3/1934 Fielder
3,524,069 A 8/1970 Stepanov et al.
(Continued)

FOREIGN PATENT DOCUMENTS

CN 101107460 1/2008
CN 101194114 A 6/2008
(Continued)

OTHER PUBLICATIONS

US 7,154,246 B2, 12/2006, Heap (withdrawn)
(Continued)

*Primary Examiner* — Derek D Knight
(74) *Attorney, Agent, or Firm* — Foley & Lardner LLP

(57) ABSTRACT

An electrified vehicle includes a front axle, a rear axle, an engine, a pump, a battery, a first electric motor electrically coupled to the battery, a second electric motor electrically coupled to the battery and configured to drive at least one of the front axle or the rear axle, a first clutch positioned between the engine and the first electric motor, and a second clutch positioned between the first electric motor and the pump. With the first clutch engaged and the second clutch disengaged, the engine is configured to drive the first electric motor to generate electricity to charge the battery. With the first clutch disengaged and the second clutch engaged, the first electric motor is configured to drive the pump. With the first clutch engaged and the second clutch engaged, the engine is configured to drive the pump.

15 Claims, 12 Drawing Sheets

Related U.S. Application Data application No. 16/275,059, filed on Feb. 13, 2019, now Pat. No. 10,982,736, which is a continuation-in-part of application No. 15/725,154, filed on Oct. 4, 2017, now Pat. No. 10,578,195, which is a continuation-in-part of application No. 15/698,415, filed on Sep. 7, 2017, now abandoned, which is a continuation-in-part of application No. 15/693,176, filed on Aug. 31, 2017, now Pat. No. 10,584,775, said application No. 15/725,154 is a continuation-in-part of application No. 15/601,670, filed on May 22, 2017, now Pat. No. 9,908,520, and a continuation-in-part of application No. 15/595,511, filed on May 15, 2017, now Pat. No. 10,029,555, and a continuation-in-part of application No. 15/595,443, filed on May 15, 2017, now Pat. No. 9,970,515, said application No. 15/693,176 is a continuation-in-part of application No. 14/918,221, filed on Oct. 20, 2015, now Pat. No. 10,421,350, said application No. 15/595,511 is a continuation of application No. 14/792,532, filed on Jul. 6, 2015, now Pat. No. 9,650,032, said application No. 15/601,670 is a continuation of application No. 14/792,535, filed on Jul. 6, 2015, now Pat. No. 9,656,659, said application No. 14/792,532 is a continuation-in-part of application No. 14/624,285, filed on Feb. 17, 2015, now Pat. No. 9,651,120, said application No. 15/595,443 is a continuation of application No. 14/624,285, filed on Feb. 17, 2015, now Pat. No. 9,651,120.

(60) Provisional application No. 62/964,998, filed on Jan. 23, 2020, provisional application No. 62/630,586, filed on Feb. 14, 2018.

(51) Int. Cl.
  *B60K 6/387* (2007.10)
  *B60K 6/442* (2007.10)
  *B60K 6/445* (2007.10)
  B60K 6/38 (2007.10)
  F16H 37/02 (2006.01)
  F16H 37/08 (2006.01)

(52) U.S. Cl.
  CPC ............ *B60K 6/445* (2013.01); *F16H 3/728* (2013.01); *B60K 2006/381* (2013.01); *F16H 37/02* (2013.01); *F16H 37/084* (2013.01); *F16H 2037/0866* (2013.01); *F16H 2037/0873* (2013.01); *F16H 2200/20* (2013.01); *F16H 2200/2002* (2013.01); *F16H 2200/2007* (2013.01); *F16H 2200/203* (2013.01); *F16H 2200/2043* (2013.01); *Y02T 10/62* (2013.01); *Y10S 903/917* (2013.01)

(56) References Cited

U.S. PATENT DOCUMENTS

| | | |
|---|---|---|
| 3,690,559 A | 9/1972 | Rudloff |
| 3,764,867 A | 10/1973 | Smi |
| 3,799,284 A | 3/1974 | Hender |
| 3,865,209 A | 2/1975 | Aihara et al. |
| 3,966,067 A | 6/1976 | Reese |
| 4,021,704 A | 5/1977 | Norbeck |
| 4,088,934 A | 5/1978 | D'Atre et al. |
| 4,097,925 A | 6/1978 | Butler, Jr. |
| 4,113,045 A | 9/1978 | Downing, Jr. |
| 4,196,785 A | 4/1980 | Downing, Jr. |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing, Jr. |
| 4,411,171 A | 10/1983 | Fiala |
| 4,423,362 A | 12/1983 | Konrad et al. |
| 4,423,794 A | 1/1984 | Beck |
| 4,444,285 A | 4/1984 | Stewart et al. |
| 4,461,988 A | 7/1984 | Plunkett |
| 4,533,011 A | 8/1985 | Heidemeyer et al. |
| 4,562,894 A | 1/1986 | Yang |
| 4,719,361 A | 1/1988 | Brubaker |
| 4,760,275 A | 7/1988 | Sato et al. |
| 4,774,399 A | 9/1988 | Fujita et al. |
| 4,774,811 A | 10/1988 | Kawamura |
| 4,809,177 A | 2/1989 | Windle et al. |
| 4,953,646 A | 9/1990 | Kim |
| 4,966,242 A | 10/1990 | Baillargeon |
| 4,985,845 A | 1/1991 | Goetz et al. |
| 5,067,932 A | 11/1991 | Edwards |
| 5,081,832 A | 1/1992 | Mowill |
| 5,120,282 A | 6/1992 | Fjaellstroem |
| 5,168,946 A | 12/1992 | Dorgan |
| 5,180,456 A | 1/1993 | Schultz et al. |
| 5,195,600 A | 3/1993 | Dorgan |
| 5,201,629 A | 4/1993 | Simpson et al. |
| 5,227,703 A | 7/1993 | Boothe et al. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,343,971 A | 9/1994 | Heidelberg et al. |
| 5,345,154 A | 9/1994 | King |
| 5,369,540 A | 11/1994 | Konrad et al. |
| 5,389,825 A | 2/1995 | Ishikawa et al. |
| 5,409,425 A | 4/1995 | Shibahata |
| 5,417,299 A | 5/1995 | Pillar et al. |
| 5,418,437 A | 5/1995 | Couture et al. |
| 5,448,561 A | 9/1995 | Kaiser et al. |
| 5,498,208 A | 3/1996 | Braun |
| 5,501,567 A | 3/1996 | Lanzdorf et al. |
| 5,504,655 A | 4/1996 | Underwood et al. |
| 5,508,594 A | 4/1996 | Underwood et al. |
| 5,508,689 A | 4/1996 | Rado et al. |
| 5,516,379 A | 5/1996 | Schultz |
| 5,538,274 A | 7/1996 | Schmitz et al. |
| 5,558,175 A | 9/1996 | Sherman |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,607,028 A | 3/1997 | Braun et al. |
| 5,629,567 A | 5/1997 | Kumar |
| 5,629,603 A | 5/1997 | Kinoshita |
| 5,646,510 A | 7/1997 | Kumar |
| 5,669,470 A | 9/1997 | Ross |
| 5,669,842 A | 9/1997 | Schmidt |
| 5,672,920 A | 9/1997 | Donegan et al. |
| 5,679,085 A | 10/1997 | Fredriksen et al. |
| 5,713,425 A | 2/1998 | Buschhaus et al. |
| 5,722,502 A | 3/1998 | Kubo |
| 5,767,584 A | 6/1998 | Gore et al. |
| 5,786,640 A | 7/1998 | Sakai et al. |
| 5,789,882 A | 8/1998 | Ibaraki et al. |
| 5,813,487 A | 9/1998 | Lee et al. |
| 5,813,488 A | 9/1998 | Weiss |
| 5,820,150 A | 10/1998 | Archer et al. |
| 5,820,258 A | 10/1998 | Braun |
| 5,828,554 A | 10/1998 | Donegan et al. |
| 5,847,520 A | 12/1998 | Theurillat et al. |
| 5,865,263 A | 2/1999 | Yamaguchi et al. |
| 5,879,265 A | 3/1999 | Bek |
| 5,880,570 A | 3/1999 | Tamaki et al. |
| 5,881,559 A | 3/1999 | Kawamura |
| 5,895,333 A | 4/1999 | Morisawa et al. |
| 5,924,879 A | 7/1999 | Kameyama |
| 5,925,993 A | 7/1999 | Lansberry |

(56) References Cited

U.S. PATENT DOCUMENTS

| | | |
|---|---|---|
| 5,927,417 A | 7/1999 | Brunner et al. |
| 5,934,395 A | 8/1999 | Koide et al. |
| 5,939,794 A | 8/1999 | Sakai et al. |
| 5,947,855 A | 9/1999 | Weiss |
| 5,957,985 A | 9/1999 | Wong et al. |
| 5,973,463 A | 10/1999 | Okuda et al. |
| 5,980,410 A | 11/1999 | Stemler et al. |
| 5,986,416 A | 11/1999 | Dubois |
| 5,991,683 A | 11/1999 | Takaoka et al. |
| 5,998,880 A | 12/1999 | Kumar |
| 6,005,358 A | 12/1999 | Radev |
| 6,012,004 A | 1/2000 | Sugano et al. |
| 6,028,403 A | 2/2000 | Fukatsu |
| 6,038,500 A | 3/2000 | Weiss |
| 6,054,844 A | 4/2000 | Frank |
| 6,086,074 A | 7/2000 | Braun |
| 6,104,148 A | 8/2000 | Kumar et al. |
| 6,105,984 A | 8/2000 | Schmitz et al. |
| 6,110,066 A | 8/2000 | Nedungadi et al. |
| 6,201,310 B1 | 3/2001 | Adachi et al. |
| 6,298,932 B1 | 10/2001 | Bowman et al. |
| 6,356,817 B1 | 3/2002 | Abe |
| 6,371,878 B1 | 4/2002 | Bowen |
| 6,387,007 B1 | 5/2002 | Fini, Jr. |
| 6,404,607 B1 | 6/2002 | Burgess et al. |
| 6,421,593 B1 | 7/2002 | Kempen et al. |
| 6,434,470 B1 | 8/2002 | Nantz et al. |
| 6,478,705 B1 | 11/2002 | Holmes et al. |
| 6,496,393 B1 | 12/2002 | Patwardhan |
| 6,501,368 B1 | 12/2002 | Wiebe et al. |
| 6,516,914 B1 | 2/2003 | Andersen et al. |
| 6,520,494 B1 | 2/2003 | Andersen et al. |
| 6,553,287 B1 | 4/2003 | Supina et al. |
| 6,553,290 B1 | 4/2003 | Pillar |
| 6,561,718 B1 | 5/2003 | Archer et al. |
| 6,563,230 B2 | 5/2003 | Nada |
| 6,575,866 B2 | 6/2003 | Bowen |
| 6,580,953 B1 | 6/2003 | Wiebe et al. |
| 6,607,466 B2 | 8/2003 | Bordini |
| 6,611,116 B2 | 8/2003 | Bachman et al. |
| 6,702,709 B2 | 3/2004 | Bowen |
| 6,722,458 B2 | 4/2004 | Hofbauer |
| 6,726,592 B2 | 4/2004 | Kotani |
| 6,757,597 B2 | 6/2004 | Yakes et al. |
| 6,764,085 B1 | 7/2004 | Anderson |
| 6,793,600 B2 | 9/2004 | Hiraiwa |
| 6,819,985 B2 | 11/2004 | Minagawa et al. |
| 6,846,257 B2 | 1/2005 | Baker et al. |
| 6,852,053 B2 | 2/2005 | Nakano et al. |
| 6,852,054 B2 | 2/2005 | Tumback et al. |
| 6,860,332 B1 | 3/2005 | Archer et al. |
| 6,882,917 B2 | 4/2005 | Pillar et al. |
| 6,885,920 B2 | 4/2005 | Yakes et al. |
| 6,886,647 B1 | 5/2005 | Gotta |
| 6,909,944 B2 | 6/2005 | Pillar et al. |
| 6,922,615 B2 | 7/2005 | Pillar et al. |
| 6,953,409 B2 | 10/2005 | Schmidt et al. |
| 6,973,600 B2 | 12/2005 | Lau et al. |
| 6,976,688 B2 | 12/2005 | Archer et al. |
| 6,991,054 B2 | 1/2006 | Takaoka et al. |
| 6,993,421 B2 | 1/2006 | Pillar et al. |
| 6,994,646 B2 | 2/2006 | Ai |
| 7,000,717 B2 | 2/2006 | Ai et al. |
| 7,004,868 B2 | 2/2006 | Oshidari et al. |
| 7,006,902 B2 | 2/2006 | Archer et al. |
| 7,024,296 B2 | 4/2006 | Squires et al. |
| 7,053,566 B2 | 5/2006 | Aizawa et al. |
| 7,072,745 B2 | 7/2006 | Pillar et al. |
| 7,073,620 B2 | 7/2006 | Braun et al. |
| 7,073,847 B2 | 7/2006 | Morrow et al. |
| 7,076,356 B2 | 7/2006 | Hubbard et al. |
| 7,086,977 B2 * | 8/2006 | Supina ............... B60L 15/20 475/5 |
| 7,107,129 B2 | 9/2006 | Rowe et al. |
| 7,127,331 B2 | 10/2006 | Pillar et al. |
| 7,140,461 B2 | 11/2006 | Morrow |
| 7,154,236 B1 | 12/2006 | Heap |
| 7,162,332 B2 | 1/2007 | Pillar et al. |
| 7,164,977 B2 | 1/2007 | Yakes et al. |
| 7,179,187 B2 | 2/2007 | Raghavan et al. |
| 7,184,862 B2 | 2/2007 | Pillar et al. |
| 7,184,866 B2 | 2/2007 | Squires et al. |
| 7,196,430 B2 | 3/2007 | Yang |
| 7,204,776 B2 | 4/2007 | Minagawa et al. |
| 7,217,211 B2 | 5/2007 | Klemen et al. |
| 7,219,756 B2 | 5/2007 | Bischoff |
| 7,223,200 B2 | 5/2007 | Kojima et al. |
| 7,234,534 B2 | 6/2007 | Froland et al. |
| 7,246,672 B2 | 7/2007 | Shirai et al. |
| 7,254,468 B2 | 8/2007 | Pillar et al. |
| 7,258,194 B2 | 8/2007 | Braun et al. |
| 7,274,976 B2 | 9/2007 | Rowe et al. |
| 7,276,007 B2 | 10/2007 | Takami et al. |
| 7,277,782 B2 | 10/2007 | Yakes et al. |
| 7,282,003 B2 | 10/2007 | Klemen et al. |
| 7,302,320 B2 | 11/2007 | Nasr et al. |
| 7,306,064 B2 | 12/2007 | Imazu et al. |
| 7,322,896 B2 | 1/2008 | Minagawa |
| 7,338,401 B2 | 3/2008 | Klemen et al. |
| 7,357,203 B2 | 4/2008 | Morrow et al. |
| 7,363,996 B2 | 4/2008 | Kamada et al. |
| 7,367,415 B2 | 5/2008 | Oliver et al. |
| 7,367,911 B2 | 5/2008 | Reghavan et al. |
| 7,379,797 B2 | 5/2008 | Nasr et al. |
| 7,392,122 B2 | 6/2008 | Pillar et al. |
| 7,412,307 B2 | 8/2008 | Pillar et al. |
| 7,419,021 B2 | 9/2008 | Morrow et al. |
| 7,439,711 B2 | 10/2008 | Bolton |
| 7,448,460 B2 | 11/2008 | Morrow et al. |
| 7,451,028 B2 | 11/2008 | Pillar et al. |
| 7,462,122 B2 | 12/2008 | Reghavan et al. |
| 7,467,678 B2 | 12/2008 | Tanaka et al. |
| 7,479,080 B2 | 1/2009 | Usoro |
| 7,493,980 B2 | 2/2009 | Hidaka |
| 7,520,354 B2 | 4/2009 | Morrow et al. |
| 7,521,814 B2 | 4/2009 | Nasr |
| 7,522,979 B2 | 4/2009 | Pillar |
| 7,527,573 B2 | 5/2009 | Lang et al. |
| 7,555,369 B2 | 6/2009 | Pillar et al. |
| 7,572,201 B2 | 8/2009 | Supina et al. |
| 7,576,501 B2 | 8/2009 | Okubo et al. |
| 7,597,164 B2 | 10/2009 | Severinsky et al. |
| 7,601,093 B2 | 10/2009 | Tabata et al. |
| 7,635,039 B2 | 12/2009 | Fujiwara et al. |
| 7,678,014 B2 | 3/2010 | Nohara et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,725,225 B2 | 5/2010 | Pillar et al. |
| 7,729,831 B2 | 6/2010 | Pillar et al. |
| 7,749,131 B2 | 7/2010 | Imamura et al. |
| 7,756,621 B2 | 7/2010 | Pillar et al. |
| 7,784,554 B2 | 8/2010 | Grady et al. |
| 7,792,618 B2 | 9/2010 | Quigley et al. |
| 7,811,191 B2 | 10/2010 | Iwase et al. |
| 7,824,293 B2 | 11/2010 | Schimke |
| 7,835,838 B2 | 11/2010 | Pillar et al. |
| 7,848,857 B2 | 12/2010 | Nasr et al. |
| 7,874,373 B2 | 1/2011 | Morrow et al. |
| 7,878,750 B2 | 2/2011 | Zhou et al. |
| 7,888,894 B2 | 2/2011 | Sugawara et al. |
| 7,908,063 B2 | 3/2011 | Sah |
| 7,927,250 B2 | 4/2011 | Imamura et al. |
| 7,931,103 B2 | 4/2011 | Morrow et al. |
| 7,935,021 B2 | 5/2011 | Tabata et al. |
| 7,935,022 B2 | 5/2011 | Iwase et al. |
| 7,937,194 B2 | 5/2011 | Nasr et al. |
| 7,941,259 B2 * | 5/2011 | Tabata ............... B60W 10/18 477/118 |
| 7,972,237 B2 | 7/2011 | Ota |
| 8,000,850 B2 | 8/2011 | Nasr et al. |
| 8,007,402 B2 | 8/2011 | Tabata et al. |
| 8,038,572 B2 | 10/2011 | Matsubara et al. |
| 8,062,172 B2 | 11/2011 | Supina et al. |

(56) References Cited

U.S. PATENT DOCUMENTS

| | | |
|---|---|---|
| 8,068,947 B2 | 11/2011 | Conlon et al. |
| 8,091,662 B2 | 1/2012 | Tolksdorf |
| 8,095,247 B2 | 1/2012 | Pillar et al. |
| 8,123,645 B2 | 2/2012 | Schimke |
| 8,231,491 B2 | 7/2012 | Oba et al. |
| 8,337,352 B2 | 12/2012 | Morrow et al. |
| 8,444,517 B2 | 5/2013 | Gradu et al. |
| 8,459,619 B2 | 6/2013 | Trinh et al. |
| 8,491,438 B2 | 7/2013 | Kim et al. |
| 8,561,735 B2 | 10/2013 | Morrow et al. |
| 8,696,506 B2 | 4/2014 | Kaltenbach et al. |
| 8,788,162 B2 | 7/2014 | Park |
| 8,795,113 B2 | 8/2014 | Grochowski et al. |
| 8,801,318 B2 | 8/2014 | Knoble et al. |
| 8,801,567 B2 | 8/2014 | Demirovic et al. |
| 8,818,588 B2 | 8/2014 | Ambrosio et al. |
| 8,864,613 B2 | 10/2014 | Morrow et al. |
| 8,894,526 B2 | 11/2014 | Kozarekar et al. |
| 8,905,892 B1 | 12/2014 | Lee et al. |
| 9,033,836 B2 | 5/2015 | Hiraiwa |
| 9,114,699 B2 | 8/2015 | Takei et al. |
| 9,114,804 B1 | 8/2015 | Shukla et al. |
| 9,132,736 B1 | 9/2015 | Shukla et al. |
| 9,376,102 B1 | 6/2016 | Shukla et al. |
| 9,428,042 B2 | 8/2016 | Morrow et al. |
| 9,452,750 B2 | 9/2016 | Shukla et al. |
| 9,492,695 B2 | 11/2016 | Betz et al. |
| 9,504,863 B2 | 11/2016 | Moore |
| 9,579,530 B2 | 2/2017 | Betz et al. |
| 9,580,962 B2 | 2/2017 | Betz et al. |
| 9,650,032 B2 | 5/2017 | Kotloski et al. |
| 9,651,120 B2 | 5/2017 | Morrow et al. |
| 9,656,659 B2 | 5/2017 | Shukla et al. |
| 9,677,334 B2 | 6/2017 | Aiken et al. |
| 9,821,789 B2 | 11/2017 | Shukla et al. |
| 9,908,520 B2 | 3/2018 | Shukla et al. |
| 9,970,515 B2 | 5/2018 | Morrow et al. |
| 10,029,555 B2 | 7/2018 | Kotloski et al. |
| 10,578,195 B2 | 3/2020 | Steinberger et al. |
| 2002/0005304 A1 | 1/2002 | Bachman et al. |
| 2002/0045507 A1 | 4/2002 | Bowen |
| 2002/0065594 A1 | 5/2002 | Squires et al. |
| 2003/0130765 A1 | 7/2003 | Pillar et al. |
| 2003/0158635 A1 | 8/2003 | Pillar et al. |
| 2003/0163228 A1 | 8/2003 | Pillar et al. |
| 2003/0163230 A1 | 8/2003 | Pillar et al. |
| 2003/0166429 A1 | 9/2003 | Tumback |
| 2003/0171854 A1 | 9/2003 | Pillar et al. |
| 2003/0195680 A1 | 10/2003 | Pillar |
| 2003/0200015 A1 | 10/2003 | Pillar |
| 2003/0230443 A1 | 12/2003 | Cramer et al. |
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0040775 A1 | 3/2004 | Shimizu et al. |
| 2004/0055802 A1 | 3/2004 | Pillar et al. |
| 2004/0069865 A1 | 4/2004 | Rowe et al. |
| 2004/0133319 A1 | 7/2004 | Pillar et al. |
| 2004/0133332 A1 | 7/2004 | Yakes et al. |
| 2004/0198551 A1 | 10/2004 | Joe et al. |
| 2004/0199302 A1 | 10/2004 | Pillar et al. |
| 2004/0251862 A1 | 12/2004 | Imai |
| 2005/0004733 A1 | 1/2005 | Pillar et al. |
| 2005/0038934 A1 | 2/2005 | Gotze et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0131600 A1 | 6/2005 | Quigley et al. |
| 2005/0137042 A1 | 6/2005 | Schmidt et al. |
| 2005/0209747 A1 | 9/2005 | Yakes et al. |
| 2005/0234622 A1 | 10/2005 | Pillar et al. |
| 2005/0252703 A1 | 11/2005 | Schmidt et al. |
| 2006/0046886 A1 | 3/2006 | Holmes et al. |
| 2006/0111213 A1 | 5/2006 | Bucknor et al. |
| 2006/0128513 A1 | 6/2006 | Tata et al. |
| 2006/0189428 A1 | 8/2006 | Raghavan et al. |
| 2006/0223663 A1 | 10/2006 | Bucknor et al. |
| 2006/0276288 A1 | 12/2006 | Iwanaka et al. |
| 2006/0289212 A1 | 12/2006 | Haruhisa |
| 2007/0021256 A1 | 1/2007 | Klemen et al. |
| 2007/0105678 A1 | 5/2007 | Bucknor et al. |
| 2007/0243966 A1 | 10/2007 | Holmes et al. |
| 2007/0254761 A1 | 11/2007 | Kim |
| 2007/0256870 A1 | 11/2007 | Holmes et al. |
| 2007/0275808 A1 | 11/2007 | Iwanaka et al. |
| 2008/0015073 A1 | 1/2008 | Raghavan et al. |
| 2008/0150350 A1 | 6/2008 | Morrow et al. |
| 2008/0200296 A1 | 8/2008 | Holmes |
| 2008/0234087 A1 | 9/2008 | Besnard et al. |
| 2008/0269000 A1 | 10/2008 | Abe et al. |
| 2008/0280726 A1 | 11/2008 | Holmes et al. |
| 2009/0054202 A1 | 2/2009 | Yamakado et al. |
| 2009/0194347 A1 | 8/2009 | Morrow et al. |
| 2009/0209381 A1 | 8/2009 | Ai et al. |
| 2009/0221390 A1 | 9/2009 | Houle |
| 2009/0227409 A1 | 9/2009 | Ito et al. |
| 2009/0227417 A1 | 9/2009 | Imamura et al. |
| 2009/0275437 A1 | 11/2009 | Kersting |
| 2010/0029428 A1 | 2/2010 | Abe et al. |
| 2010/0051361 A1 | 3/2010 | Katsuta et al. |
| 2010/0051367 A1 | 3/2010 | Yamada et al. |
| 2010/0070008 A1 | 3/2010 | Parker et al. |
| 2010/0120579 A1 | 5/2010 | Kawasaki |
| 2010/0121512 A1 | 5/2010 | Takahashi et al. |
| 2010/0137091 A1 | 6/2010 | Park et al. |
| 2010/0138086 A1 | 6/2010 | Imamura et al. |
| 2010/0145589 A1 | 6/2010 | Kobayashi |
| 2010/0179009 A1 | 7/2010 | Wittkopp et al. |
| 2010/0227722 A1 | 9/2010 | Conlon |
| 2010/0261565 A1 | 10/2010 | Ai et al. |
| 2010/0301668 A1 | 12/2010 | Yakes et al. |
| 2010/0312423 A1 | 12/2010 | Steinhauser et al. |
| 2010/0326752 A1 | 12/2010 | Lamperth |
| 2011/0127095 A1 | 6/2011 | Imamura et al. |
| 2011/0130234 A1 | 6/2011 | Phillips |
| 2011/0143875 A1 | 6/2011 | Ono et al. |
| 2011/0312459 A1 | 12/2011 | Morrow et al. |
| 2011/0319211 A1 | 12/2011 | Si |
| 2012/0022737 A1 | 1/2012 | Kumazaki et al. |
| 2012/0226401 A1 | 9/2012 | Naito |
| 2013/0090202 A1 | 4/2013 | Hiraiwa |
| 2013/0151131 A1 | 6/2013 | Laszio et al. |
| 2013/0196806 A1 | 8/2013 | Morrow et al. |
| 2013/0260936 A1 | 10/2013 | Takei et al. |
| 2013/0296108 A1 | 11/2013 | Ortmann et al. |
| 2014/0094334 A1 | 4/2014 | Tamai et al. |
| 2014/0136035 A1 | 5/2014 | Boskovitch et al. |
| 2014/0141915 A1 | 5/2014 | Naqi et al. |
| 2014/0228168 A1 | 8/2014 | Kaufman et al. |
| 2014/0229043 A1 | 8/2014 | Frank et al. |
| 2014/0235394 A1 | 8/2014 | Smetana et al. |
| 2014/0243149 A1 | 8/2014 | Holmes et al. |
| 2014/0269145 A1 | 9/2014 | Fasana et al. |
| 2014/0288756 A1 | 9/2014 | Tanaka et al. |
| 2014/0303822 A1 | 10/2014 | Kawamura et al. |
| 2014/0335995 A1 | 11/2014 | Swales et al. |
| 2014/0350803 A1 | 11/2014 | Ye et al. |
| 2014/0357441 A1 | 12/2014 | Supina |
| 2014/0358340 A1 | 12/2014 | Radev |
| 2015/0024894 A1 | 1/2015 | Lee et al. |
| 2015/0183436 A1 | 7/2015 | Rekow et al. |
| 2015/0246331 A1 | 9/2015 | Broker et al. |
| 2015/0283894 A1 | 10/2015 | Morrow et al. |
| 2015/0292600 A1 | 10/2015 | Ai et al. |
| 2015/0377327 A1 | 12/2015 | Lee et al. |
| 2016/0133557 A1 | 5/2016 | Mortensen et al. |
| 2016/0288780 A1 | 10/2016 | Shukla et al. |
| 2016/0311253 A1 | 10/2016 | Palmer et al. |
| 2016/0361987 A1 | 12/2016 | Morrow et al. |
| 2017/0008507 A1 | 1/2017 | Shukla et al. |
| 2017/0102059 A1 | 4/2017 | Rekow et al. |
| 2017/0108085 A1 | 4/2017 | Morrow et al. |
| 2017/0246946 A1 | 8/2017 | Morrow et al. |

(56) References Cited

U.S. PATENT DOCUMENTS

| | | |
|---|---|---|
| 2017/0246947 A1 | 8/2017 | Kotloski et al. |
| 2017/0253229 A1 | 9/2017 | Shukla et al. |
| 2017/0363180 A1 | 12/2017 | Steinberger et al. |
| 2017/0370446 A1 | 12/2017 | Steinberger et al. |
| 2018/0023671 A1 | 1/2018 | Watt et al. |
| 2018/0023672 A1 | 1/2018 | Watt et al. |
| 2018/0031085 A1 | 2/2018 | Steinberger et al. |
| 2018/0072303 A1 | 3/2018 | Shukla et al. |
| 2018/0162351 A1 | 6/2018 | Shukla et al. |
| 2018/0222484 A1 | 8/2018 | Shively et al. |
| 2018/0259042 A1 | 9/2018 | Morrow et al. |
| 2018/0326832 A1 | 11/2018 | Kotloski et al. |
| 2018/0345783 A1 | 12/2018 | Morrow et al. |
| 2019/0111910 A1 | 4/2019 | Shukla et al. |
| 2019/0178350 A1 | 6/2019 | Steinberger et al. |
| 2019/0217698 A1 | 7/2019 | Broker et al. |
| 2019/0242460 A1 | 8/2019 | Morrow et al. |

FOREIGN PATENT DOCUMENTS

| | | |
|---|---|---|
| CN | 101318459 A | 12/2008 |
| CN | 101323243 A | 12/2008 |
| CN | 101356070 A | 1/2009 |
| CN | 101631688 A | 1/2010 |
| CN | 103158526 A | 6/2013 |
| CN | 104553731 A | 4/2015 |
| CN | 107405990 | 11/2017 |
| DE | 18 16 183 | 6/1970 |
| DE | 41 08 647 A1 | 9/1992 |
| DE | 41 34 160 A1 | 4/1993 |
| DE | 44 31 929 C1 | 10/1995 |
| DE | 19749074 A1 | 5/1999 |
| DE | 19851436 A1 | 5/2000 |
| DE | 10 2011 109 352 A1 | 2/2013 |
| DE | 2011109352 A1 | 2/2013 |
| DE | 10 2013 006 028 A1 | 10/2014 |
| EP | 0 791 506 A2 | 8/1997 |
| EP | 0 622 264 B1 | 11/1998 |
| EP | 0 898 213 A1 | 2/1999 |
| EP | 0 925 981 A2 | 6/1999 |
| EP | 1 018 451 A1 | 7/2000 |
| EP | 0 805 059 B1 | 8/2000 |
| EP | 1 092 406 A2 | 4/2001 |
| EP | 0 564 943 B1 | 6/2001 |
| EP | 1 142 744 A1 | 10/2001 |
| EP | 0 812 720 B1 | 12/2001 |
| EP | 1 229 636 A2 | 8/2002 |
| EP | 1 340 643 A2 | 9/2003 |
| EP | 0 937 600 B1 | 12/2005 |
| EP | 2 867 088 A1 | 5/2015 |
| FR | 2658259 A1 | 8/1991 |
| GB | 1 308 318 | 2/1973 |
| GB | 2 302 850 A | 2/1997 |
| GB | 2 346 124 A | 8/2000 |
| GB | 2 400 588 A | 1/2005 |
| GB | 2 400 589 A | 2/2005 |
| GB | 2 400 590 A | 3/2005 |
| JP | 60-216703 A | 10/1985 |
| JP | 2010-070008 A | 4/2010 |
| JP | 2013-112318 A1 | 6/2013 |
| KR | 10-2010-0095073 A | 8/2010 |
| WO | WO-98/19875 A1 | 5/1998 |
| WO | WO-00/30235 A1 | 5/2000 |
| WO | WO-01/54939 A2 | 8/2001 |
| WO | WO-03/055714 A1 | 7/2003 |
| WO | WO-2004/083081 A2 | 9/2004 |
| WO | WO-2004/110849 | 12/2004 |
| WO | WO-2006/028452 | 3/2006 |
| WO | WO-2006/037041 | 4/2006 |
| WO | WO-2006/037098 | 4/2006 |
| WO | WO-2006/037099 | 4/2006 |
| WO | WO-2007/108805 A1 | 9/2007 |
| WO | WO-2011/041549 | 4/2011 |
| WO | WO-2011/163135 | 12/2011 |
| WO | WO-2014/090483 A1 | 6/2014 |
| WO | WO-2014/090486 A1 | 6/2014 |
| WO | WO-2014/102030 A1 | 7/2014 |
| WO | WO-2014/140096 A1 | 9/2014 |
| WO | WO-2014/158078 A1 | 10/2014 |
| WO | WO-2014/166723 A1 | 10/2014 |
| WO | WO-2016/133557 A1 | 8/2016 |
| WO | WO-2016/172250 | 10/2016 |
| WO | WO-2017/007599 | 1/2017 |
| WO | WO-2017/007600 | 1/2017 |
| WO | WO-2017/070388 A1 | 4/2017 |
| WO | WO-2017/106410 A1 | 6/2017 |
| WO | WO-2019/046758 A1 | 3/2019 |

OTHER PUBLICATIONS

Bose, et al., "High Frequency AC vs. DC Distribution System for Next Generation Hybrid Electric Vehicle," Industrial Electronics, Control and Instrumentation, Proceedings of the 1996 IEEE IECON 22nd International Conference on Taipei, Taiwan, New York, New York, pp. 706-712 Aug. 5-10, 1996.
European Search Report based on European Application No. EP 0724300, date of completion of the search Jul. 4, 2005, 2 pages.
Dana Spicer Central Tire Inflation System Specifications, Dana Corporation, Kalamazoo, Michigan, 2 pages, May 2000.
Diesel Locomotive Technology, http://www.railway-technical.com/diesel.shtml, available by Jan. 24, 2012, 15 pages.
International Preliminary Report on Patentability on PCT/US2015/050518, mailed Aug. 22, 2017, 11 pages.
International Search Report and Written Opinion on PCT/US2015/050518, dated Feb. 9, 2016, 18 pages.
International Search Report and Written Opinion on PCT/US2016/038586, dated Oct. 21, 2016, 14 pages.
International Search Report and Written Opinion on PCT/US2016/038587, dated Nov. 10, 2016, 15 pages.
International Search Report and Written Opinion on PCT/US2016/057971, dated Jan. 27, 2017, 11 pages.
International Search Report and Written Opinion on PCT/US2018/049158, Dec. 13, 2018, 18 pages.
International Search Report and Written Opinion on PCT/US2018/049550, Dec. 13, 2018, 18 pages.
International Search Report and Written Opinion on PCT/US2018/053983, Jan. 3, 2019, 18 pages.
International Search Report and Written Opinion on PCT/US2019/017854, dated May 10, 2019, 17 pages.
International Search Report for PCT Application No. PCT/US2011/041089, mail date Dec. 19, 2011, 6 pages.
Invitation to Pay Additional Fees regarding International Application No. PCT/US2011/041089, mail date Sep. 6, 2011, 5 pages.
Khan, I.A., Automotive Electrical Systems: Architecture and Components, Digital Avionics Systems Conference, IEEE, pp. 8.C.5-1-8.C.5-10, 1999.
Miller, Hybrid Electric Vehicle Propulsion System Architectures of the e-CVT Type, IEEE Transactions on Power Electronics, vol. 21, No. 3, May 2006, 12 pages.
Namuduri, et al., High Power Density Electric Drive for an Hybrid Vehicle, Applied Power Electronics Conference and Exposition, pp. 34-40, Feb. 15, 1998.
Rajashekara, K., History of Electric Vehicles in General Motors, Industry Applications Society Annual Meeting, pp. 447-454, Oct. 2-8, 1993.
Search Report Received for Chinese Application No. 201580076245.5, Oshkosh Corporation, Jan. 2, 2019, 2 pages.
Shigley et al., Theory of Machines and Mechanisms, complete text, McGraw-Hill Book Company, published in the United States, 297 pages, 1980.

* cited by examiner

DRIVELINE FOR ELECTRIFIED VEHICLE

CROSS-REFERENCE TO RELATED PATENT APPLICATIONS

This application is a continuation of U.S. application Ser. No. 17/156,122, filed Jan. 22, 2021, which claims the benefit of U.S. Provisional Application No. 62/964,998, filed Jan. 23, 2020, and is a continuation-in-part of U.S. application Ser. No. 16/275,059, filed Feb. 13, 2019, which claims the benefit of U.S. Provisional Application No. 62/630,586, filed Feb. 14, 2018 and is a continuation-in-part of U.S. application Ser. No. 15/725,154, filed Oct. 4, 2017, which is a continuation-in-part of: U.S. application Ser. No. 15/698,415, filed Sep. 7, 2017, which is a continuation-in-part of U.S. application Ser. No. 15/693,176, filed Aug. 31, 2017, which is a continuation-in-part of U.S. application Ser. No. 14/918,221, filed Oct. 20, 2015; U.S. application Ser. No. 15/595,443, filed May 15, 2017, now U.S. Pat. No. 9,970,515, which is a continuation of U.S. application Ser. No. 14/624,285, filed Feb. 17, 2015, now U.S. Pat. No. 9,651,120; U.S. application Ser. No. 15/595,511, filed May 15, 2017, now U.S. Pat. No. 10,029,555, which is a continuation of U.S. application Ser. No. 14/792,532, filed Jul. 6, 2015, now U.S. Pat. No. 9,650,032, which is a continuation-in-part of U.S. application Ser. No. 14/624,285, filed Feb. 17, 2015, now U.S. Pat. No. 9,651,120; and U.S. application Ser. No. 15/601,670, filed May 22, 2017, now U.S. Pat. No. 9,908,520, which is a continuation of U.S. application Ser. No. 14/792,535, filed Jul. 6, 2015, now U.S. Pat. No. 9,656,659, which is a continuation-in-part of U.S. application Ser. No. 14/624,285, filed Feb. 17, 2015, now U.S. Pat. No. 9,651,120, all of which are incorporated herein by reference in their entireties.

BACKGROUND

Internal combustion engine vehicles, hybrid vehicles, and electric vehicles, among other types of vehicles, include transmissions. Traditional vehicle transmissions use gears and gear trains to provide speed and torque conversions from a rotating power source (e.g., an engine, a motor, etc.) to another device (e.g., a drive shaft, wheels of a vehicle, etc.). Transmissions include multiple gear ratios selectively coupled to the rotating power source with a mechanism. The mechanism may also selectively couple an output to the various gear ratios.

SUMMARY

One exemplary embodiment relates to an electrified vehicle. The electrified vehicle includes a front axle, a rear axle, an engine, a pump, a battery, a first electric motor electrically coupled to the battery, a second electric motor electrically coupled to the battery and configured to drive at least one of the front axle or the rear axle, a first clutch positioned between the engine and the first electric motor, and a second clutch positioned between the first electric motor and the pump. With the first clutch engaged and the second clutch disengaged, the engine is configured to drive the first electric motor to generate electricity to charge the battery. With the first clutch disengaged and the second clutch engaged, the first electric motor is configured to drive the pump. With the first clutch engaged and the second clutch engaged, the engine is configured to drive the pump.

Another exemplary embodiment relates to an electrified vehicle. The electrified vehicle include an axle, an engine, a pump, a battery, a first electric motor electrically coupled to the battery, a second electric motor electrically coupled to the battery and configured to drive the axle, a first clutch positioned to selectively couple the engine with the first electric motor, and a second clutch positioned to selectively couple the first electric motor with the pump.

Another exemplary embodiment relates to an electrified vehicle. The electrified vehicle include an axle, an engine, a pump, a battery, a first electric motor electrically coupled to the battery, a second electric motor electrically coupled to the battery and configured to drive the axle, a first clutch positioned to couple the engine with the first electric motor, a second clutch positioned to couple the first electric motor with the pump, a first gearset positioned between the first electric motor and the pump, and a second gearset positioned between the second electric motor and the axle.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a multi-mode inline electromechanical variable transmission is provided as part of a vehicle and is selectively reconfigurable between a plurality of operating modes. The vehicle may also include an engine and one or more tractive elements (e.g., wheel and tire assemblies, etc.). The multi-mode inline electromechanical variable transmission may include a first electromagnetic device and a second electromagnetic device. In one embodiment, at least one of the first electromagnetic device and the second electromagnetic device provides rotational mechanical energy to start the engine. In another embodiment, the engine provides a rotational mechanical energy input to both the first and second electromagnetic devices such that each operates as a generator to generate electrical energy. In still other embodiments, one of the first electromagnetic device and the second electromagnetic device are configured to receive a rotational mechanical energy output from the engine and provide an electrical energy output to power a control system and/or the other electromagnetic device. According to an exemplary embodiment, the multi-mode inline electromechanical variable transmission has a compact design that facilitates direct replacement of traditional inline transmissions (e.g., mechanical transmissions, transmissions without electromagnetic devices, etc.) used in front engine applications. Thus, the multi-mode inline electromechanical variable transmission may be installed during a new vehicle construction or installed to replace a conventional transmission of a front engine vehicle (e.g., as opposed to replacing a traditional midship transfer case, etc.). The multi-mode inline electromechanical variable transmission may additionally or alternatively be installed as part of a rear-engine vehicle (e.g., a bus, etc.).

Figure 1:
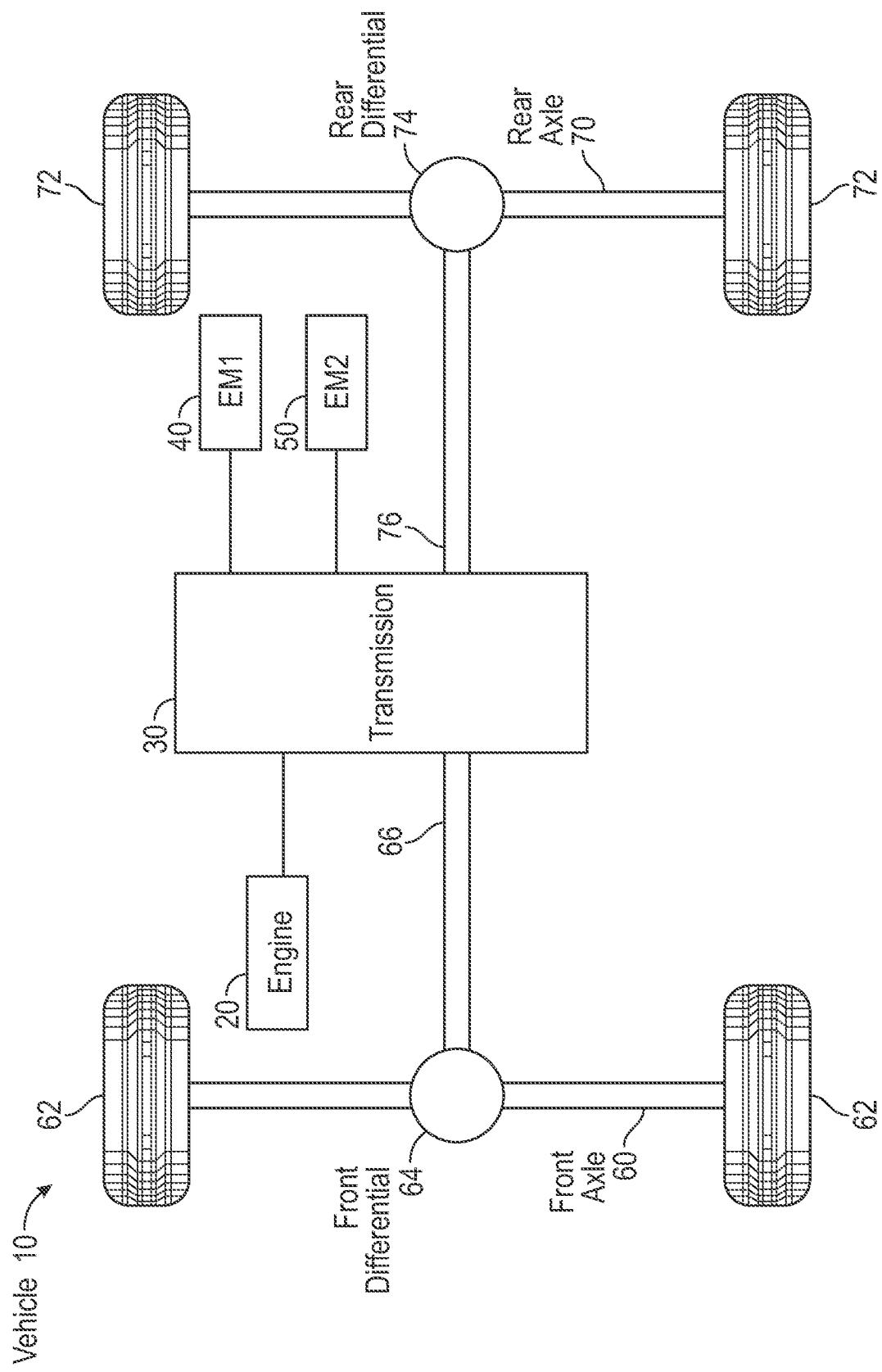
FIG. 1 is a schematic view of a vehicle having a drive train, according to an exemplary embodiment.
Figure 2:
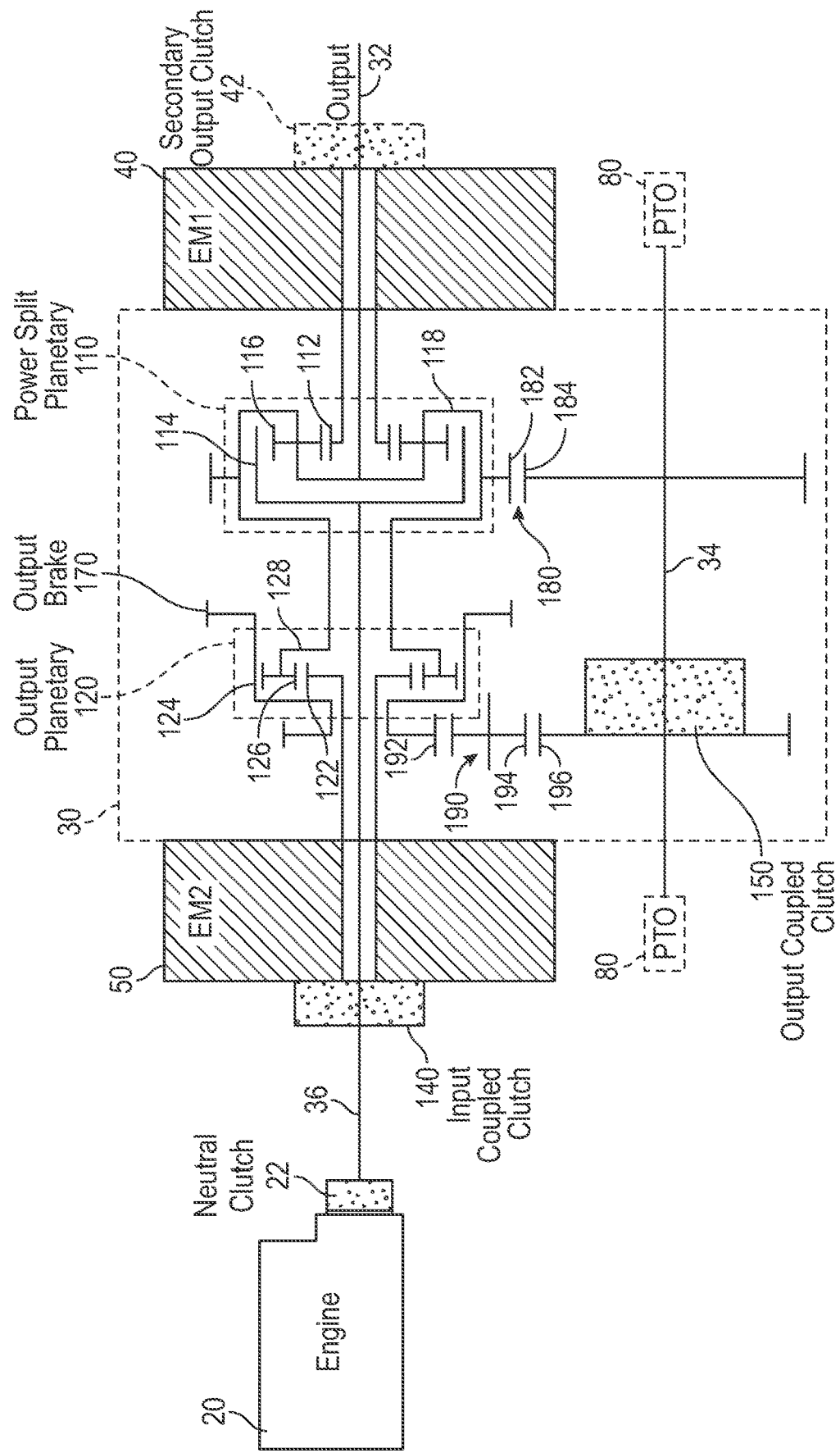
FIG. 2 is a detailed schematic view of the drive train of FIG. 1, according to an exemplary embodiment.

According to the exemplary embodiment shown in FIGS. 1-2, a vehicle 10 includes an engine 20 coupled to a transmission, shown as transmission 30. In one embodiment, engine 20 is configured to combust fuel and provide a mechanical energy input to transmission 30. By way of example, engine 20 may be configured to provide a rotational mechanical energy input to transmission 30. As shown in FIGS. 1-2, transmission 30 includes a first electrical machine, electromagnetic device, and/or motor/generator, shown as first electromagnetic device 40, and a second electrical machine, electromagnetic device, and/or motor/generator, shown as second electromagnetic device 50. According to an exemplary embodiment, vehicle 10 is configured as a rear engine vehicle and transmission 30 is configured as a multi-mode inline electromechanical transmission. In other embodiments, vehicle 10 is configured as a mid-engine vehicle or a front engine vehicle.

Referring again to the exemplary embodiment shown in FIG. 1, vehicle 10 includes a front axle, shown as front axle 60, and a rear axle, shown as rear axle 70. As shown in FIG. 1, front axle 60 includes a pair of tractive elements, shown as tires 62, coupled to a front differential, shown as front differential 64. Rear axle 70 includes a pair of tractive elements, shown as tires 72, coupled to a rear differential, shown as rear differential 74, according to an exemplary embodiment. According to the exemplary embodiment shown in FIG. 1, front differential 64 is coupled to transmission 30 with a front axle driveshaft 66, and rear differential 74 is coupled to transmission 30 with a rear axle driveshaft 76. While shown as coupled to tires 62 and tires 72, front differential 64 and rear differential 74 may be coupled to various other types of tractive elements (e.g., tracks, etc.), according to alternative embodiments. As shown in FIG. 1, front axle driveshaft 66 and rear axle driveshaft 76 are configured to transport power from first electromagnetic device 40, second electromagnetic device 50, and engine 20 to tires 62 and tires 72, respectively. Vehicle 10 may include a plurality of front differentials 64 that may be coupled and/or a plurality of rear differentials 74 that may be coupled, according to various alternative embodiments. In some embodiments, transmission 30 is selectively coupled (e.g., via a clutch mechanism, coupling mechanism, etc.) to at least one of the front axle driveshaft 66 and the rear axle driveshaft 76 (e.g., to reconfigure vehicle 10 into a front-wheel-drive configuration, a rear-wheel-drive configuration, an all-wheel-drive configuration, a four-wheel-drive configuration, etc.).

Engine 20 may be any source of rotational mechanical energy that is derived from a stored energy source. The stored energy source is disposed onboard vehicle 10, according to an exemplary embodiment. The stored energy source may include a liquid fuel or a gaseous fuel, among other alternatives. In one embodiment, engine 20 includes an internal combustion engine configured to be powered by at least one of gasoline, natural gas, and diesel fuel. According to various alternative embodiments, engine 20 includes at least one of a turbine, a fuel cell, and an electric motor, or still another device. According to one exemplary embodiment, engine 20 includes a twelve liter diesel engine capable of providing between approximately 400 horsepower and approximately 600 horsepower and between approximately 400 foot pounds of torque and approximately 2000 foot pounds of torque. In one embodiment, engine 20 has a rotational speed (e.g., a rotational operational range, etc.) of between 0 and 2,100 revolutions per minute. Engine 20 may be operated at a relatively constant speed (e.g., 1,600 revolutions per minute, etc.). In one embodiment, the relatively constant speed is selected based on an operating condition of engine 20 (e.g., an operating speed relating to a point of increased fuel efficiency, etc.).

In one embodiment, at least one of first electromagnetic device 40 and second electromagnetic device 50 provide a mechanical energy input to another portion of transmission 30. By way of example, at least one of first electromagnetic device 40 and second electromagnetic device 50 may be configured to provide a rotational mechanical energy input to another portion of transmission 30 (i.e., at least one of first electromagnetic device 40 and second electromagnetic device 50 may operate as a motor, etc.). At least one of first electromagnetic device 40 and second electromagnetic device 50 may receive a mechanical energy output from at least one of engine 20 and another portion of transmission 30. By way of example, at least one of first electromagnetic device 40 and second electromagnetic device 50 may be configured to receive a rotational mechanical energy output from at least one of engine 20 and another portion of transmission 30 and provide an electrical energy output (i.e., at least one of first electromagnetic device 40 and second electromagnetic device 50 may operate as a generator, etc.). According to an exemplary embodiment, first electromagnetic device 40 and second electromagnetic device 50 are capable of both providing mechanical energy and converting a mechanical energy input into an electrical energy output (i.e., selectively operate as a motor and a generator, etc.). The operational condition of first electromagnetic device 40 and second electromagnetic device 50 (e.g., as a motor, as a generator, etc.) may vary based on a mode of operation associated with transmission 30.

According to the exemplary embodiment shown in FIG. 2, a drive system for a vehicle, shown as drive system 100, includes engine 20, transmission 30, first electromagnetic device 40, and second electromagnetic device 50. Transmission 30 may include first electromagnetic device 40 and second electromagnetic device 50. As shown in FIG. 2, transmission 30 includes a first power transmission device or gear set, shown as power split planetary 110, and a second power transmission device or gear set, shown as output planetary 120. In one embodiment, power split planetary 110 and output planetary 120 are positioned outside of (e.g., on either side of, sandwiching, not between, etc.) first electromagnetic device 40 and second electromagnetic device 50. As shown in FIG. 2, one or both of power split planetary 110 and output planetary 120 are disposed between (e.g., sandwiched by, etc.) first electromagnetic device 40 and second electromagnetic device 50.

Referring to the exemplary embodiment shown in FIG. 2, power split planetary 110 is a planetary gear set that includes a sun gear 112, a ring gear 114, and a plurality of planetary gears 116. The plurality of planetary gears 116 couple sun gear 112 to ring gear 114, according to an exemplary embodiment. As shown in FIG. 2, a carrier 118 rotationally supports the plurality of planetary gears 116. In one embodiment, first electromagnetic device 40 is directly coupled to sun gear 112 such that power split planetary 110 is coupled to first electromagnetic device 40. By way of example, first electromagnetic device 40 may include or be coupled to a shaft (e.g., a first shaft, an input shaft, an output shaft, etc.) directly coupled to sun gear 112.

Referring still to the exemplary embodiment shown in FIG. 2, output planetary 120 is a planetary gear set that includes a sun gear 122, a ring gear 124, and a plurality of planetary gears 126. The plurality of planetary gears 126 couple sun gear 122 to ring gear 124, according to an exemplary embodiment. As shown in FIG. 2, a carrier 128 rotationally supports the plurality of planetary gears 126. In one embodiment, second electromagnetic device 50 is directly coupled to sun gear 122 such that output planetary 120 is coupled to second electromagnetic device 50. By way of example, second electromagnetic device 50 may include or be coupled to a shaft (e.g., a second shaft, an input shaft, an output shaft, etc.) directly coupled to sun gear 122. Carrier 118 is directly coupled to carrier 128, thereby coupling power split planetary 110 to output planetary 120, according to the exemplary embodiment shown in FIG. 2. In one embodiment, directly coupling carrier 118 to carrier 128 synchronizes the rotational speeds of carrier 118 and carrier 128.

Carrier 118 is directly rotationally coupled to an output with a shaft, shown as output shaft 32, according to the exemplary embodiment shown in FIG. 2. Output shaft 32 may be coupled to at least one of rear axle driveshaft 76 and front axle driveshaft 66. By way of example, output shaft 32 may be coupled to a transfer case and/or rear axle driveshaft 76 where transmission 30 is installed in place of a traditional, mechanical, straight-thru transmission. In another embodiment, the output is a PTO output, and output shaft 32 is coupled thereto. A clutch assembly may be engaged and disengaged to selectively couple at least one of front axle driveshaft 66, a transfer case, and rear axle driveshaft 76 to output shaft 32 of transmission 30 (e.g., to facilitate operation of a vehicle in a rear-wheel-drive mode, an all-wheel-drive mode, a four-wheel-drive mode, a front-wheel-drive mode, etc.). As shown in FIG. 2, the transmission 30 includes an auxiliary shaft, shown as jack shaft 34. In some embodiments, jack shaft 34 is offset (e.g., radially offset) from first electromagnetic device 40, second electromagnetic machine 50, power split planetary 110, and/or output planetary 120. As shown in FIG. 2, transmission 30 includes a shaft, shown as connecting shaft 36. A clutch, shown as neutral clutch 22 is positioned to selectively couple engine 20 to connecting shaft 36. Neutral clutch 22 may be a component of engine 20 or transmission 30 or a separate component. According to an exemplary embodiment, neutral clutch 22 and connecting shaft 36 directly couple engine 20 to power split planetary 110. In one embodiment, neutral clutch 22 and connecting shaft 36 directly couple engine 20 with ring gear 114 of power split planetary 110. According to an exemplary embodiment, power split planetary 110 is at least one of directly coupled to and directly powers a power takeoff ("PTO") (e.g., a live PTO, etc.). By way of example, ring gear 114 and/or carrier 118 of power split planetary 110 may be at least one of directly coupled to and directly power the PTO. According to an alternative embodiment, neutral clutch 22 is omitted, and connecting shaft 36 is directly coupled to engine 20.

As shown in FIG. 2, transmission 30 includes a first clutch, shown as input coupled clutch 140. Input coupled clutch 140 is positioned to selectively couple second electromagnetic device 50 with engine 20, according to an exemplary embodiment. Input coupled clutch 140 may thereby selectively couple engine 20 to output planetary 120. As shown in FIG. 2, connecting shaft 36 extends from neutral clutch 22, through input coupled clutch 140 and second electromagnetic device 50, and through output planetary 120 to power split planetary 110. Input coupled clutch 140 may selectively couple second electromagnetic device 50 with connecting shaft 36. Accordingly, input coupled clutch 140 may selectively couple connecting shaft 36 to sun gear 122 of output planetary 120. According to an exemplary embodiment, first electromagnetic device 40 and second electromagnetic device 50 (e.g., input/output shafts thereof, etc.) are aligned (e.g., radially aligned, etc.) with power split planetary 110, output planetary 120, connecting shaft 36, and/or output shaft 32 (e.g., centerlines thereof are aligned, to thereby form a straight-thru or inline transmission arrangement, etc.).

Jack shaft 34 is rotationally coupled to carrier 118 of power split planetary 110 and thereby to output shaft 32. According to the exemplary embodiment shown in FIG. 2, transmission 30 further includes a second clutch, shown as output coupled clutch 150. Output coupled clutch 150 is positioned to selectively couple jackshaft 34 to ring gear 124 of output planetary 120. In some embodiments, jack shaft 34 is rotationally coupled (e.g., selectively rotationally coupled, etc.) to one or more outputs, shown as PTO outputs 80 (e.g., to drive one or more hydraulic pumps, to power one or more hydraulic systems, to power one or more electrical power generation systems, to power one or more pneumatic systems, etc.). In other embodiments, the one or more outputs are used to power (e.g., drive, etc.) a vehicle with which transmission 30 is associated.

Transmission 30 may further include a third clutch, shown in FIG. 2 as secondary output clutch 42. In other embodiments, secondary output clutch 42 is omitted. Secondary output clutch 42 is positioned to selectively couple first electromagnetic device 40 with output shaft 32, according to an exemplary embodiment. Secondary output clutch 42 may thereby selectively couple output shaft 32 and carrier 118 to sun gear 112 of power split planetary 110. As shown in FIG. 2, output shaft 32 extends from power split planetary 110, through first electromagnetic device 40, and out through secondary output clutch 42. In other embodiments, secondary output clutch 42 is omitted.

In some embodiments, neutral clutch 22 is biased into an engaged position (e.g., with a spring, etc.) and selectively disengaged (e.g., with application of pressurized hydraulic fluid, etc.). In some embodiments, input coupled clutch 140 is biased into a disengaged position (e.g., with a spring, etc.) and selectively engaged (e.g., with application of pressurized hydraulic fluid, etc.). In some embodiments, output coupled clutch 150 is biased into a disengaged position (e.g., with a spring, etc.) and selectively engaged (e.g., with application of pressurized hydraulic fluid, etc.). In some embodiments, secondary output clutch 42 is biased into a disengaged position (e.g., with a spring, etc.) and selectively engaged (e.g., with application of pressurized hydraulic fluid, etc.). In other embodiments, one or more of neutral clutch 22, input coupled clutch 140, output coupled clutch 150, and secondary output clutch 42 are hydraulically-biased and spring released.

Referring again to the exemplary embodiment shown in FIG. 2, transmission 30 includes a brake, shown as output brake 170. Output brake 170 is positioned to selectively inhibit the movement of at least a portion of output planetary 120 (e.g., ring gear 124, etc.), according to an exemplary embodiment. In one embodiment, output brake 170 is biased into a disengaged position (e.g., with a spring, etc.) and selectively engaged (e.g., with application of pressurized hydraulic fluid, etc.). In other embodiments, output brake 170 is hydraulically-biased and spring released. In still other embodiments, the components of transmission 30 are still otherwise engaged and disengaged (e.g., pneumatically, etc.). By way of example, output brake 170 and output coupled clutch 150 may be engaged simultaneously, providing a driveline brake such that rotational movement of at least one of output planetary 120 (e.g., ring gear 124, etc.), power split planetary 110 (e.g., carrier 118, etc.), jack shaft 34, and output shaft 32 are selectively limited.

As shown in FIG. 2, transmission 30 includes a gear set 180 that couples carrier 118 and carrier 128 to jack shaft 34. In one embodiment, gear set 180 includes a first gear, shown as gear 182, in meshing engagement with a second gear, shown as gear 184. As shown in FIG. 2, gear 182 is rotatably coupled to carrier 118 and carrier 128. By way of example, gear 182 may be fixed to a component (e.g., shaft, tube, etc.) that couples carrier 118 and carrier 128. As shown in FIG. 2, gear 184 is rotatably coupled to jack shaft 34. By way of example, gear 184 may be fixed directly to the jack shaft 34.

According to an exemplary embodiment, transmission 30 includes a gear set, shown as gear set 190, that couples output planetary 120 to jack shaft 34. As shown in FIG. 2, gear set 190 includes a first gear, shown as gear 192, coupled to ring gear 124 of output planetary 120. Gear 192 is in meshing engagement with a second gear, shown as gear 194, according to an exemplary embodiment. As shown in FIG. 2, gear 194 is coupled to a third gear, shown as gear 196. Gear 194 may reverse the rotation direction of an output provided by gear 192 (e.g., gear 194 may facilitate rotating jack shaft 34 in the same direction as that of gear 192, etc.). In other embodiments, gear 192 is directly coupled with gear 196. By way of example, gear set 190 may not include gear 194, and gear 192 may be directly coupled to (e.g., in meshing engagement with, etc.) gear 196. As shown in FIG. 2, output coupled clutch 150 is positioned to selectively couple gear 196 with output shaft 32 when engaged. With output coupled clutch 150 disengaged, relative movement (e.g., rotation, etc.) may occur between gear 196 and jack shaft 34. By way of example, output coupled clutch 150 may be engaged to couple ring gear 124 to jack shaft 34. Output brake 170 is positioned to selectively limit the movement of gear 192 when engaged to thereby also limit the movement of ring gear 124, gear 194, and gear 196.

Figure 3:
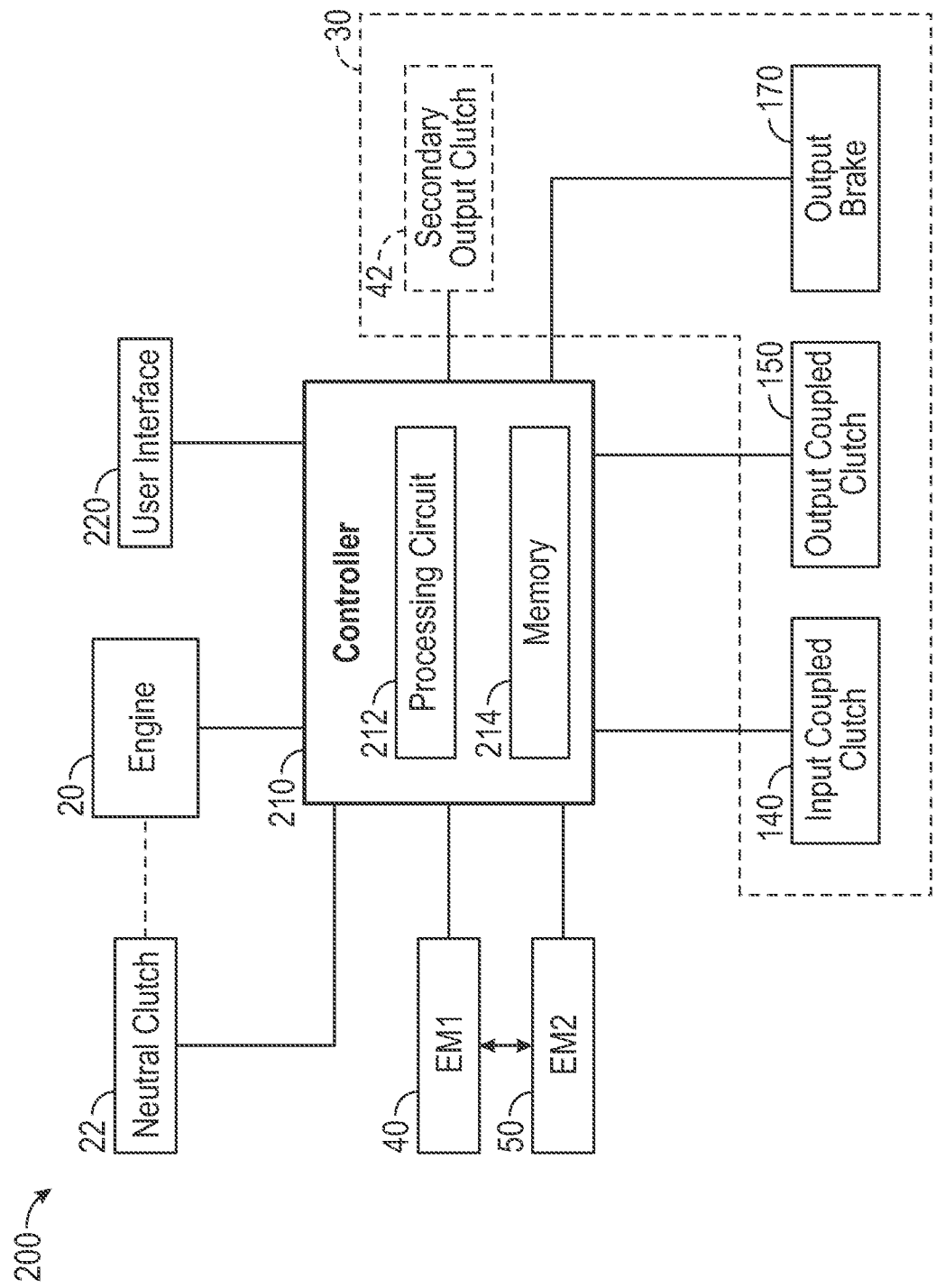
FIG. 3 is a schematic diagram of a control system for the drive train of FIG. 1, according to an exemplary embodiment.

According to the exemplary embodiment shown in FIG. 3, a control system 200 for a vehicle (e.g., vehicle 10, etc.) includes a controller 210. In one embodiment, controller 210 is configured to selectively engage, selectively disengage, or otherwise communicate with components of the vehicle according to various modes of operation. As shown in FIG. 3, controller 210 is coupled to engine 20. In one embodiment, controller 210 is configured to selectively engage engine 20 (e.g., interface with a throttle thereof, etc.) such that an output of engine 20 rotates at a target rate. Controller 210 is coupled to first electromagnetic device 40 and second electromagnetic device 50, according to an exemplary embodiment, and may send and receive signals therewith. By way of example, controller 210 may send command signals relating to at least one of a target mode of operation, a target rotational speed, and a target rotation direction for first electromagnetic device 40 and second electromagnetic device 50. As shown in FIG. 3, first electromagnetic device 40 and second electromagnetic device 50 are electrically coupled (e.g., by an electrical power transmission system, etc.). By way of example, power generated by first electromagnetic device 40 may be utilized by second electromagnetic device 50 (e.g., to provide an output torque as a motor, etc.), or power generated by second electromagnetic device 50 may be utilized by first electromagnetic device 40 (e.g., to provide an output torque as a motor, etc.). Controller 210 is configured to selectively engage and selectively disengage neutral clutch 22, secondary output clutch 42, input coupled clutch 140, output coupled clutch 150, and output brake 170 directly or by interacting with another component (e.g., a pump, a valve, a solenoid, a motor, etc.).

According to an exemplary embodiment, the drive system 100 includes an energy storage device (e.g., a battery, etc.). In such embodiments, the battery may be charged and recharged by an electromagnetic device that is generating power. The battery may supply the electromagnetic device that is motoring the vehicle to propel the vehicle. In some embodiments, the battery may always be utilized as part of the drive system 100. In other embodiments, the battery may be used only when excess generated power must be stored or excess power is required to motor the vehicle.

According to alternative embodiments, drive system 100 may be configured to operate with first electromagnetic device 40 and second electromagnetic device 50, and no additional sources of electrical power. Additional sources of electrical power include, for example, a battery and other energy storage devices. Without an energy storage device, first electromagnetic device 40 and second electromagnetic device 50 may operate in power balance. One of the electromagnetic devices may provide all of the electrical power required by the other electromagnetic device (as well as the electrical power required to offset power losses). First electromagnetic device 40 and second electromagnetic device 50 may operate without doing either of (a) providing electrical power to an energy storage device or (b) consuming electrical power from an energy storage device. Thus, the sum of the electrical power produced or consumed by first electromagnetic device 40, the electrical power produced or consumed by second electromagnetic device 50, and electrical power losses may be zero. According to the embodiment of FIGS. 1-3, two electromagnetic devices are shown. In other embodiments, the system includes three or more electromagnetic devices.

According to the exemplary embodiment shown in FIG. 3, control system 200 includes a user interface 220 that is coupled to controller 210. In one embodiment, user interface 220 includes a display and an operator input. The display may be configured to display a graphical user interface, an image, an icon, or still other information. In one embodiment, the display includes a graphical user interface configured to provide general information about the vehicle (e.g., vehicle speed, fuel level, warning lights, etc.). The graphical user interface may be configured to also display a current mode of operation, various potential modes of operation, or still other information relating to transmission 30 and/or drive system 100. By way of example, the graphical user interface may be configured to provide specific information regarding the operation of drive system 100 (e.g., whether neutral clutch 22, secondary output clutch 42, input coupled clutch 140, output coupled clutch 150, and/or output brake 170 are engaged or disengaged, a fault condition where at least one of neutral clutch 22, secondary output clutch 42, input coupled clutch 140, output coupled clutch 150, and/or output brake 170 fail to engage or disengage in response to a command signal, etc.).

The operator input may be used by an operator to provide commands to at least one of engine 20, transmission 30, first electromagnetic device 40, second electromagnetic device 50, and drive system 100 or still another component of the vehicle. The operator input may include one or more buttons, knobs, touchscreens, switches, levers, or handles. In one embodiment, an operator may press a button to change the mode of operation for at least one of transmission 30, and drive system 100, and the vehicle. The operator may be able to manually control some or all aspects of the operation of transmission 30 using the display and the operator input. It should be understood that any type of display or input controls may be implemented with the systems and methods described herein.

Controller 210 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 3, controller 210 includes a processing circuit 212 and a memory 214. Processing circuit 212 may include an ASIC, one or more FPGAs, a DSP, circuits containing one or more processing components, circuitry for supporting a microprocessor, a group of processing components, or other suitable electronic processing components. In some embodiments, processing circuit 212 is configured to execute computer code stored in memory 214 to facilitate the activities described herein. Memory 214 may be any volatile or non-volatile computer-readable storage medium capable of storing data or computer code relating to the activities described herein. According to an exemplary embodiment, memory 214 includes computer code modules (e.g., executable code, object code, source code, script code, machine code, etc.) configured for execution by processing circuit 212. Memory 214 includes various actuation profiles corresponding to modes of operation (e.g., for transmission 30, for drive system 100, for a vehicle, etc.), according to an exemplary embodiment. In some embodiments, controller 210 may represent a collection of processing devices (e.g., servers, data centers, etc.). In such cases, processing circuit 212 represents the collective processors of the devices, and memory 214 represents the collective storage devices of the devices.

Referring next to the exemplary embodiments shown in FIGS. 4-12, transmission 30 is configured to operate according to a plurality of modes of operation. Various modes of operation for transmission 30 are identified below in Table 1. In other embodiments, a vehicle having transmission 30 is configured to operate according to the various modes of operation shown in FIGS. 4-12 and identified below in Table 1.

TABLE 1

| Mode of Operation | Neutral Clutch 22 | Output Coupled Clutch 150 | Output Brake 170 | Input Coupled Clutch 140 |
|---|---|---|---|---|
| Mid Speed Reverse | X | | X | |
| Low Speed Reverse | X | X | | |
| Power Generation | X | | | X |
| Neutral/Vehicle Start | X | X | X | |
| Low Range | X | X | | |
| Mid Range | X | | X | |
| Shift | X | | X | X |
| High Range | X | | | X |

As shown in Table 1, an "X" represents a component of drive system 100 (e.g., output brake 170, input coupled clutch 140, etc.) that is engaged or closed during the respective modes of operation. Secondary output clutch 42 is disengaged in each of the modes shown in Table 1.

In each of the modes shown in Table 1 and FIGS. 4-12, neutral clutch 22 is engaged. When engaged, neutral clutch 22 couples engine 20 to transmission 30. When disengaged, neutral clutch 22 decouples engine 20 from transmission 30. Accordingly, neutral clutch 22 may be used to isolate engine 20 from transmission 30. Neutral clutch 22 may facilitate maintenance or towing of vehicle 10. Further, with neutral clutch 22 disengaged, electromagnetic device 40 and/or electromagnetic device 50 may be used to drive output shaft 32 and/or jack shaft 34 (e.g., to drive one or more PTO outputs 80) independent of engine 20 (e.g., without engine 20 running).

Throughout each of the modes shown in Table 1 and FIGS. 4-12, secondary output clutch 42 is disengaged. When engaged, secondary output clutch 42 limits rotation of output shaft 32 and carrier 118 relative to sun gear 112, thereby preventing rotation of the planetary gears 116 about central axes thereof. Accordingly, secondary output clutch 42 limits the rotation of ring gear 114 relative to carrier 118, such that rotation of connecting shaft 36 causes a corresponding rotation of output shaft 32 and electromagnetic device 40. According to an exemplary embodiment, an energy flow path with only the neutral clutch 22 and the secondary output clutch 42 engaged includes: engine 20 providing a rotational mechanical energy input to connecting shaft 36 through the neutral clutch 22; connecting shaft 36 conveying the rotational mechanical energy to ring gear 114; ring gear 114 conveying the rotational mechanical energy to the plurality of planetary gears 116; planetary gears 116 causing rotation of carrier 118 and sun gear 112 (e.g., planetary gears 116 may not rotate relative to carrier 118 or sun gear 112 because of the coupling caused by secondary output clutch 42, etc.); sun gear 112 driving first electromagnetic device 40 such that it operates as a generator (e.g., generates electrical energy, etc.); and carrier 118 driving the output shaft 32. With secondary output clutch 42 engaged, ring gear 124 and sun gear 122 may rotate freely such that second electromagnetic device 50 may rotate independently of engine 20.

Figure 4:
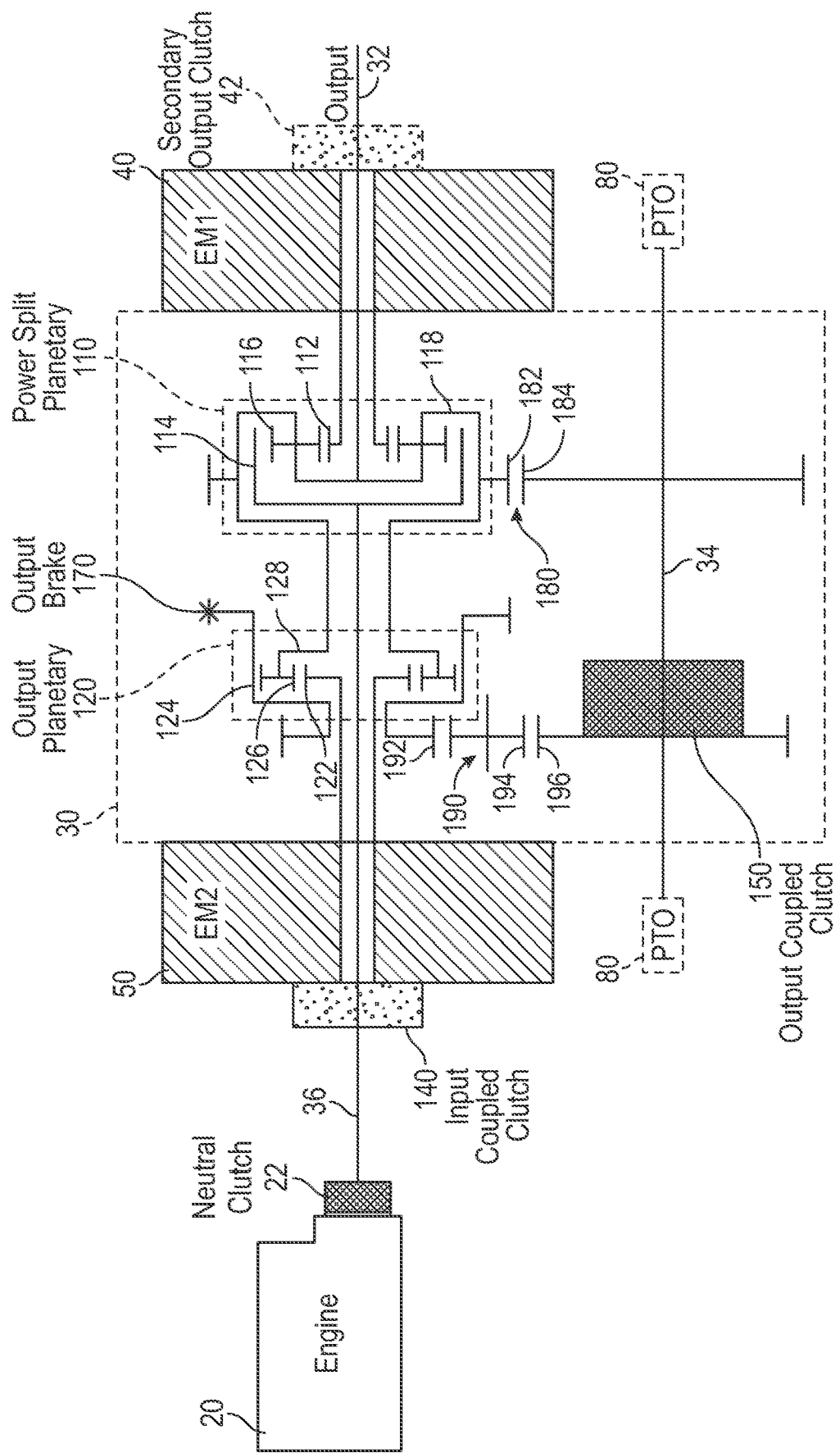
FIG. 4 is a detailed schematic view of a drive train configured in a neutral/startup mode of operation, according to an exemplary embodiment.
Figure 5:
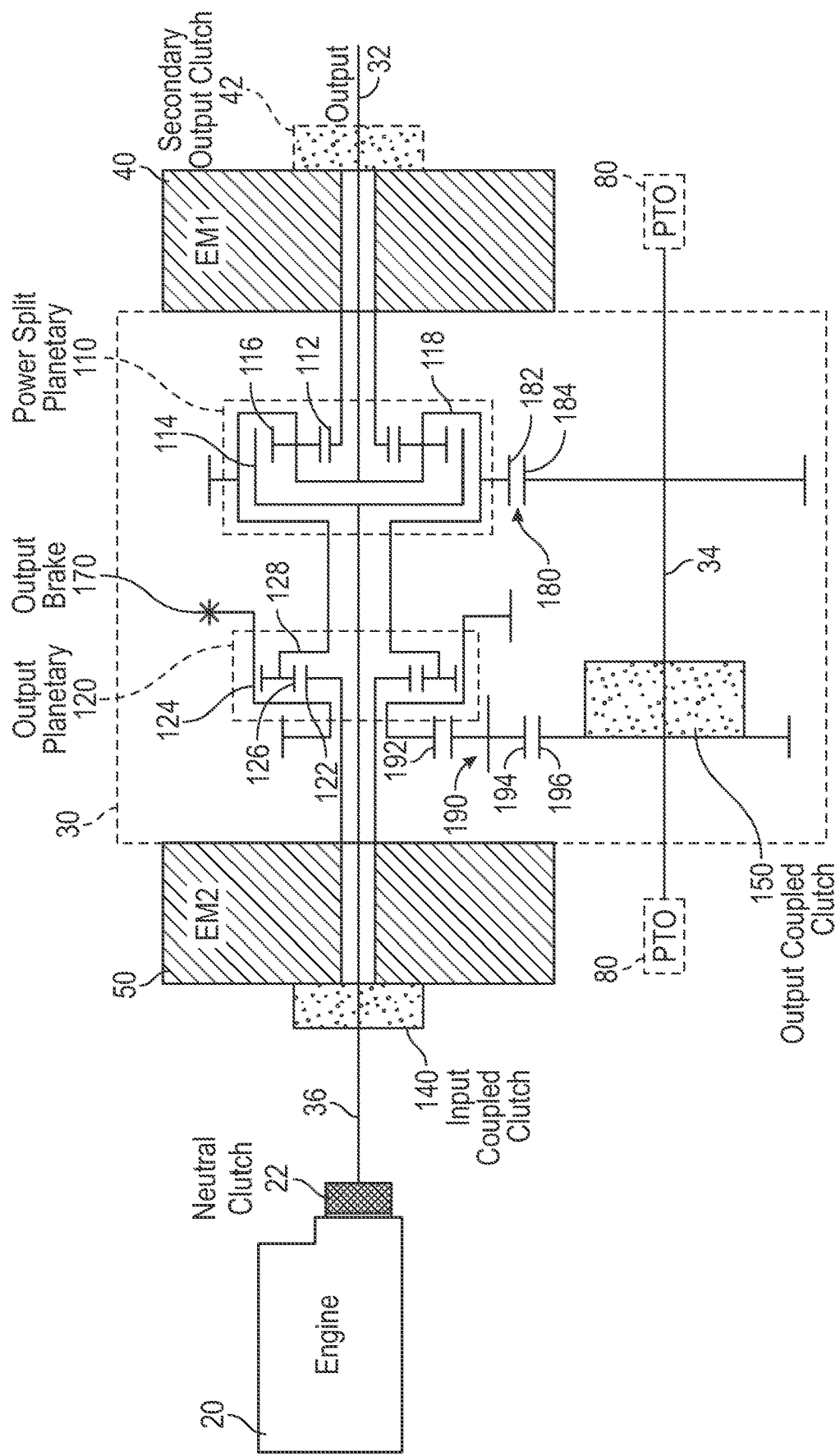
FIG. 5 is a detailed schematic view of a drive train configured in a neutral/startup mode of operation, according to another exemplary embodiment.

As shown in FIGS. 4 and 5, transmission 30 is selectively reconfigured into neutral/startup modes. The neutral/startup mode may provide a true neutral for transmission 30. In one embodiment, at least one of first electromagnetic device 40 and second electromagnetic device 50 include and/or are coupled to an energy storage device (e.g., a capacitor, a battery, etc.) configured to store energy (e.g., electrical energy, chemical energy, etc.) associated with drive system 100. In one embodiment, rotation of first electromagnetic device 40 rotates connecting shaft 36 to start engine 20 (e.g., with neutral clutch 22, output coupled clutch 150, and output brake 170 engaged, etc.). In another embodiment, rotation of second electromagnetic device 50 rotates connecting shaft 36 to start engine 20 (e.g., with neutral clutch 22 and input coupled clutch 140 engaged, etc.). First electromagnetic device 40 or second electromagnetic device 50 may be configured to use the stored energy to start engine 20 by providing a rotational mechanical energy input (e.g., a torque, etc.) to engine 20 through connecting shaft 36.

In an alternative embodiment, engine 20 includes a traditional starting mechanism (e.g., a starter motor, etc.) configured to start engine 20 (e.g., in response to a vehicle start request, in response to an engine start request, etc.). The vehicle start request and/or the engine start request may include a directive to turn the engine "on" from an "off" state. The vehicle may include at least one of a pushbutton, a graphical user interface, an ignition, and another device with which a user interacts to provide or trigger the vehicle start request and/or the engine start request. Engine 20 may provide a rotational mechanical energy input to at least one of first electromagnetic device 40 and/or second electromagnetic device 50. First electromagnetic device 40 and second electromagnetic device 50 may be brought up to a threshold (e.g., a threshold speed, a threshold speed for a target period of time, a threshold power generation, a threshold power generation for a target period of time, etc.) that establishes a requisite DC bus voltage for controlling first electromagnetic device 40 and/or second electromagnetic device 50. Both first electromagnetic device 40 and second electromagnetic device 50 may thereafter be activated and controlled within and/or to desired states. The power electronics of control system 200 that control the motor-to-motor functions may be brought online during the neutral/startup mode.

As shown in FIG. 4 and Table 1, neutral clutch 22, output coupled clutch 150, and output brake 170 are engaged when transmission 30 is configured in the neutral/startup mode. According to an exemplary embodiment, engaging neutral clutch 22, output brake 170, and output coupled clutch 150 selectively limits the rotational movement of portions of both power split planetary 110 and output planetary 120. By way of example, engaging output brake 170 may inhibit the rotational movement of ring gear 124, gear 192, gear 194, and gear 196 such that each remains rotationally fixed. Engaging output coupled clutch 150 may inhibit rotational movement of jack shaft 34 such that jack shaft 34 remains rotationally fixed (e.g., since gear 196 is fixed and output coupled clutch 150 is engaged, etc.). With jack shaft 34 rotationally fixed, gear set 180 and carrier 118 become rotationally fixed, thereby isolating output shaft 32 from engine 20, first electromagnetic device 40, and second electromagnetic device 50 in the neutral/startup mode. Such isolation may substantially eliminate a forward lurch potential of the vehicle during startup (e.g., transmission 30 does not provide an output torque to tires 62 and/or tires 72, etc.). Alternatively, as shown in FIG. 5, output coupled clutch 150 may be disengaged (e.g., before startup, during startup, after startup, etc.). However, disengaging output coupled clutch 150 may not prevent rotation of the jack shaft 34 and thereby output shaft 32.

According to an exemplary embodiment, an energy flow path in the neutral/startup mode includes: first electromagnetic device 40 providing a rotational mechanical energy input to sun gear 112 that is received by the plurality of planetary gears 116; the plurality of planetary gears 116 rotating about central axes thereof (e.g., planetary gears 116 may not rotate about sun gear 112 because carrier 118 may be rotationally fixed, etc.); the plurality of planetary gears 116 conveying the rotational mechanical energy to ring gear 114; ring gear 114 transferring the rotational mechanical energy to the neutral clutch 22 through the connecting shaft 36 such that the rotational mechanical energy provided by first electromagnetic device 40 starts engine 20.

An alternative energy flow path in the neutral/startup mode may include starting engine 20 with a traditional starting mechanism, engine 20 providing a rotational mechanical energy input to ring gear 114 that is received by the plurality of planetary gears 116; the plurality of planetary gears 116 rotating about central axes thereof (e.g., planetary gears 116 may or may not rotate about sun gear 112 because carrier 118 may or may not be rotationally fixed, etc.); the plurality of planetary gears 116 conveying the rotational mechanical energy to sun gear 112; and sun gear 112 conveying the rotational mechanical energy to first electromagnetic device 40 to bring first electromagnetic device 40 up to the threshold for establishing a requisite DC bus voltage and controlling first electromagnetic device 40 and/or second electromagnetic device 50 in a desired state. By way of example, the neutral/startup mode may be used to start engine 20, establish a requisite DC bus voltage, or otherwise export power without relying on controller 210 to engage first electromagnetic device 40 and/or second electromagnetic device 50. Transmission 30 may provide increased export power potential relative to traditional transmission systems.

Figure 6:
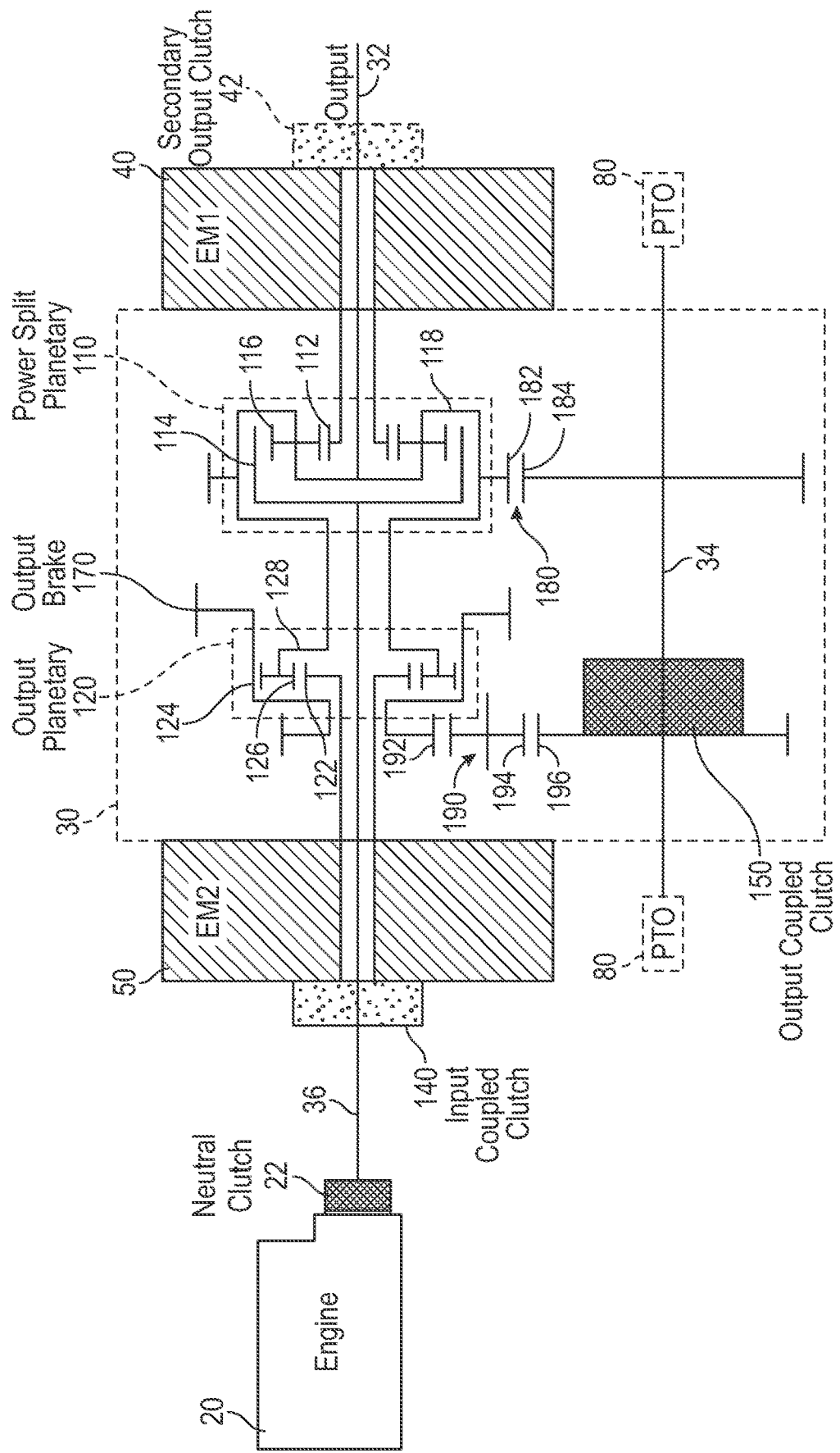
FIG. 6 is a detailed schematic view of a drive train configured in a low range mode of operation, according to an exemplary embodiment.

As shown in FIG. 6, transmission 30 is selectively reconfigured into a low range mode of operation such that transmission 30 allows for a low output speed operation with a high output torque (e.g., in a forward direction of travel, etc.). The low range mode increases a vehicle's gradability (e.g., facilitates the vehicle maintaining speed on a grade, etc.). In one embodiment, engine 20 provides a rotational mechanical energy input to transmission 30 such that first electromagnetic device 40 generates electrical power and second electromagnetic device 50 uses the generated electrical power to provide a rotational mechanical energy output. As such, at least one of engine 20 and second electromagnetic device 50 provide a rotational mechanical energy input to drive at least one of tires 62 and tires 72. In an alternative embodiment, first electromagnetic device 40 operates as a motor and second electromagnetic device 50 operates as a generator when transmission 30 is configured in the low range forward mode. In still another alternative embodiment, both first electromagnetic device 40 and second electromagnetic device 50 operate as a generator in the low range forward mode. In yet another embodiment, transmission 30 is not selectively reconfigurable into the low range mode of operation. In one such embodiment, transmission 30 does not include jack shaft 34, does not include gear set 190 (e.g., gear 192, gear 194, gear 196, etc.), and does not include output coupled clutch 150. Transmission 30 may additionally or alternatively not include gear set 180 in embodiments where transmission 30 is not selectively reconfigurable into the low range mode of operation.

As shown in FIG. 6 and Table 1, neutral clutch 22 and output coupled clutch 150 are engaged when transmission 30 is configured in the low range mode. As shown in FIG. 6, output coupled clutch 150 couples gear set 190 to jack shaft 34. Accordingly, when engine 20 provides a rotational mechanical energy input to transmission 30, at least one of engine 20 and second electromagnetic device 50 drive output shaft 32 through the interaction of connecting shaft 36 and jack shaft 34 with power split planetary 110, respectively. According to the exemplary embodiment shown in FIG. 6, an energy flow path for the low range includes: engine 20 providing a rotational mechanical energy input to connecting shaft 36 through the neutral clutch 22; connecting shaft 36 conveying the rotational mechanical energy to ring gear 114; ring gear 114 causing the plurality of planetary gears 116 to rotate about central axes thereof, as well as about sun gear 112 such that carrier 118 and output shaft 32 rotate; and the rotation of the plurality of planetary gears 116 about a central axis causing a rotation of sun gear 112, thus driving first electromagnetic device 40 such that it operates as a generator (e.g., generates electrical energy, etc.).

Referring still to FIG. 6, the rotation of carrier 118 drives both carrier 128 and gear set 180. Carrier 128 drives the plurality of planetary gears 126 to rotate about sun gear 122 and about central axes thereof. In one embodiment, second electromagnetic device 50 receives electrical energy generated by first electromagnetic device 40. Accordingly, second electromagnetic device 50 operates as a motor, providing a rotational mechanical energy input to sun gear 122. The sun gear 122 conveys the rotational mechanical energy to the plurality of planetary gears 126 such that each further rotates about the central axis thereof. The plurality of planetary gears 126 drive ring gear 124, and the rotation of ring gear 124 drives gear set 190. According to the exemplary embodiment shown in FIG. 6, gear set 180 and gear set 190 transfer a torque to and from jack shaft 34 with output coupled clutch 150 engaged. As such, engine 20 and second electromagnetic device 50 move a vehicle at a low speed with a high output torque.

Figure 7:
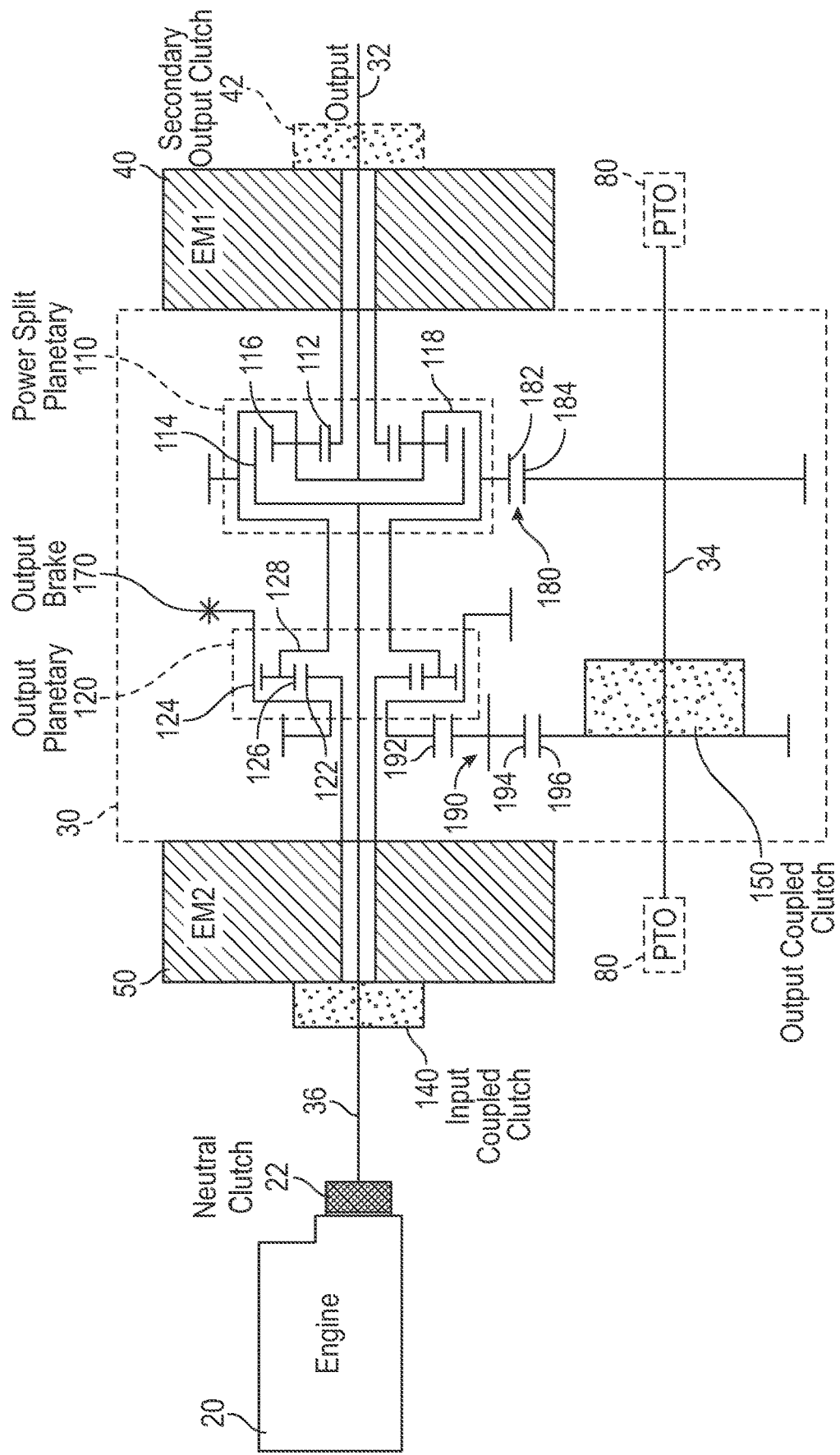
FIG. 7 is a detailed schematic view of a drive train configured in a mid range mode of operation, according to an exemplary embodiment.

As shown in FIG. 7, transmission 30 is selectively reconfigured into a mid range mode of operation. In the mid range mode of operation, transmission 30 may facilitate a mid range output speed operation (e.g., in a forward direction of travel, etc.). The speed range associated with the mid range mode of operation may be larger than that of traditional transmissions (i.e., transmission 30 may provide increased coverage in the mid range, etc.). The mid range mode may improve low output speed torque and high output speed power. In one embodiment, engine 20 provides a rotational mechanical energy input such that first electromagnetic device 40 generates electrical power, and second electromagnetic device 50 uses the generated electrical power to provide a rotational mechanical energy output. Second electromagnetic device 50 thereby provides a rotational mechanical energy input to drive at least one of tires 62 and tires 72. In an alternative embodiment, second electromagnetic device 50 operates as a generator while first electromagnetic device 40 operates as a motor when transmission 30 is configured in the mid range mode. In still another alternative embodiment, both first electromagnetic device 40 and second electromagnetic device 50 operate as a generator in the mid range mode.

As shown in FIG. 7 and Table 1, neutral clutch 22 and output brake 170 are engaged when transmission 30 is configured in the mid range mode. As shown in FIG. 7, output brake 170 inhibits the rotation of gear set 190 (e.g., gear 192, gear 194, gear 196, etc.). Output brake 170 thereby rotationally fixes ring gear 124. In one embodiment, engaging output brake 170 substantially eliminates a power dip between output and input modes of transmission 30. According to the exemplary embodiment shown in FIG. 7, an energy flow path for the mid range forward mode includes: engine 20 providing a rotational mechanical energy input to connecting shaft 36 that is conveyed to ring gear 114; ring gear 114 driving the plurality of planetary gears 116 to rotate about central axes thereof, as well as about sun gear 112 such that both carrier 118 and sun gear 112 rotate; and the rotation of carrier 118 driving the output shaft 32.

With ring gear 124 fixed by output brake 170, second electromagnetic device 50 may operate as a motor. In one embodiment, second electromagnetic device 50 receives electrical energy generated by first electromagnetic device 40. First electromagnetic device 40 operates as a generator, removing a rotational mechanical energy from sun gear 112. The sun gear 122 conveys rotational mechanical torque from the second electromagnetic device 50 to the plurality of planetary gears 126 such that each further rotates about sun gear 122 (e.g., at an increased rotational speed, etc.). The rotation of the plurality of planetary gears 126 (e.g., effected by sun gear 122, etc.) drives carrier 128 and thereby carrier 118. Carrier 118 drives output shaft 32 at a mid range output speed and may thereby drive a vehicle at a mid range output speed.

Figure 8:
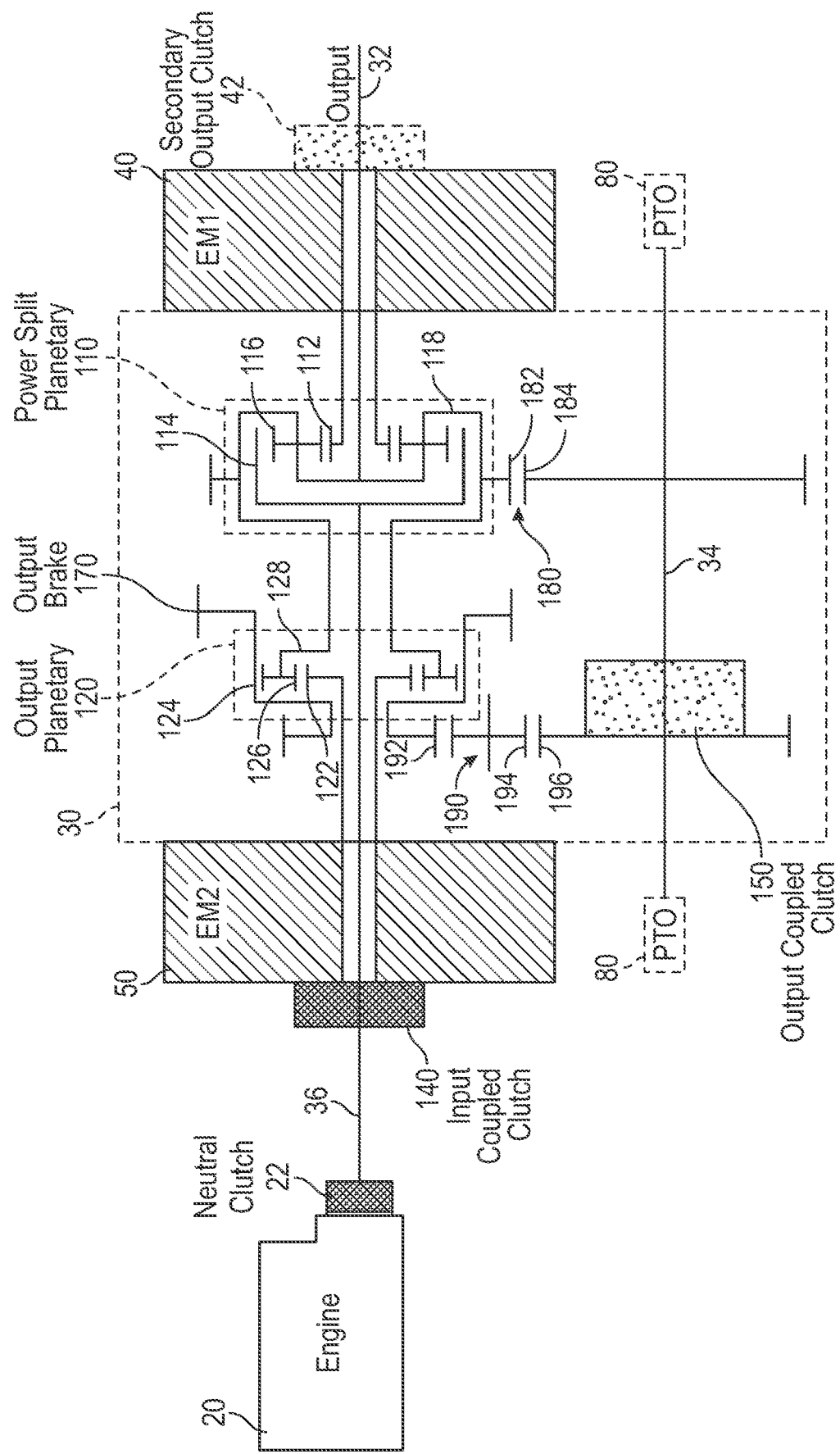
FIG. 8 is a detailed schematic view of a drive train configured in a high range mode of operation, according to an exemplary embodiment.

As shown in FIG. 8, transmission 30 is selectively reconfigured into a high range mode of operation such that transmission 30 allows for a high output speed operation (e.g., in a forward direction of travel, etc.). In one embodiment, engine 20 provides a rotational mechanical energy input such that second electromagnetic device 50 generates electrical power while first electromagnetic device 40 uses the generated electrical power to provide a rotational mechanical energy output. As such, at least one of engine 20 and first electromagnetic device 40 provide rotational mechanical energy to drive at least one of tires 62 and tires 72. In an alternative embodiment, first electromagnetic device 40 operates as a generator and second electromagnetic device 50 operates as a motor when transmission 30 is configured in the high range mode.

As shown in FIG. 8 and Table 1, neutral clutch 22 and input coupled clutch 140 are engaged when transmission 30 is configured in the high range mode. As shown in FIG. 8, the engagement of input coupled clutch 140 with connecting shaft 36 rotationally couples engine 20 and second electromagnetic device 50. By way of example, engine 20 may provide a rotational mechanical energy input to connecting shaft 36 such that second electromagnetic device 50 generates electrical energy. In one embodiment, first electromagnetic device 40 receives the electrical energy generated by second electromagnetic device 50. First electromagnetic device 40 operates as a motor, providing a rotational mechanical energy input to sun gear 112 that drives the plurality of planetary gears 116 and carrier 118.

Referring still to FIG. 8, power from engine 20 is transferred to ring gear 114 and the plurality of planetary gears 116. The plurality of planetary gears 116 are driven by at least one of engine 20 (e.g., via ring gear 114, etc.) and first electromagnetic device 40 (e.g., via sun gear 112, etc.). Carrier 118 rotates, which drives output shaft 32 such that the rotational mechanical energy provided by engine 20 and first electromagnetic device 40 drives a vehicle at a high range speed.

Figure 9:
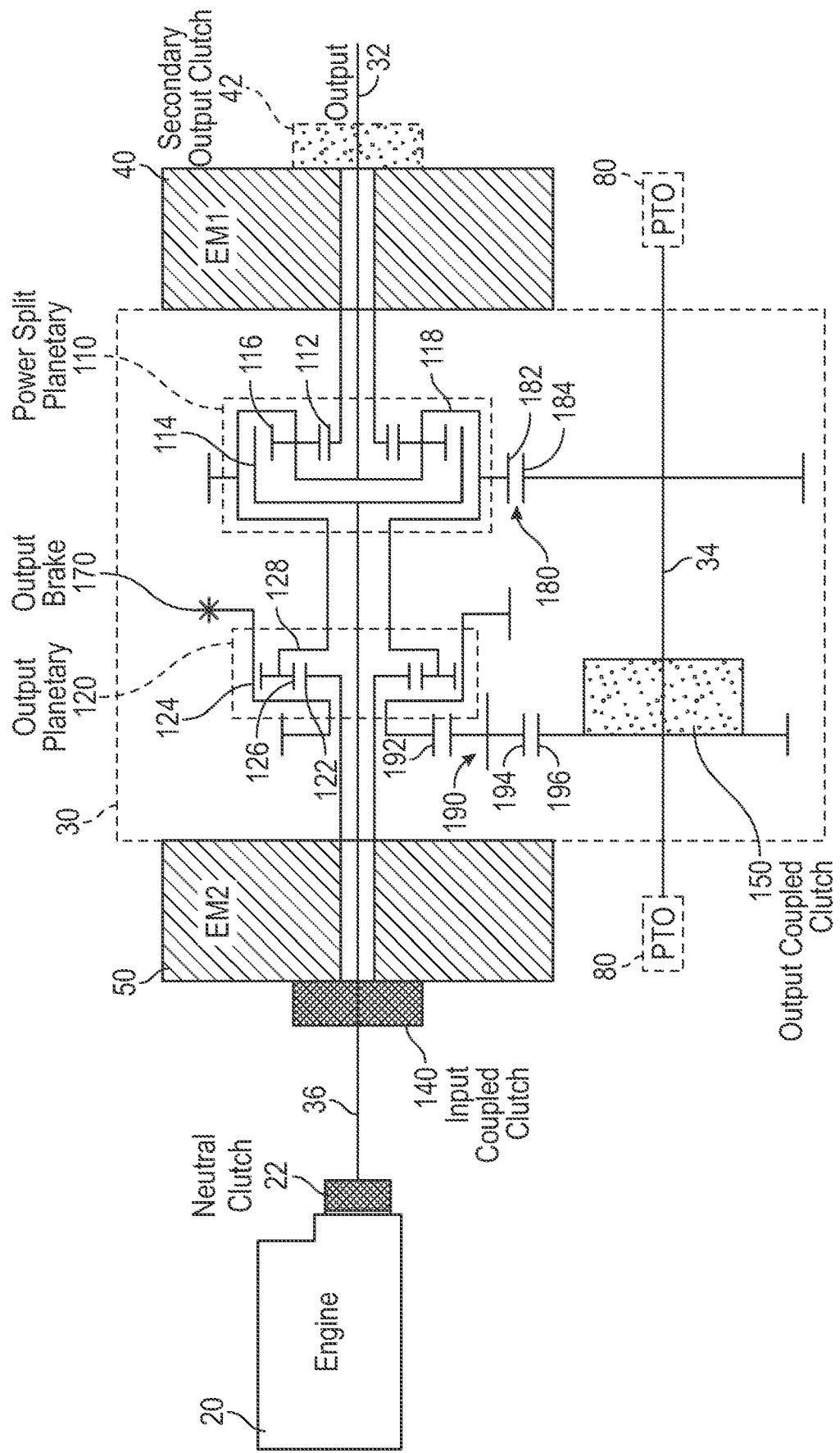
FIG. 9 is a detailed schematic view of a drive train configured in an intermediate shift mode of operation, according to an exemplary embodiment.

As shown in FIG. 9, transmission 30 is selectively reconfigured into an intermediate shift mode of operation that facilitates transitioning transmission 30 (i.e., shifting, changing modes, etc.) between the mid range mode of operation and the high range mode of operation. According to the embodiment shown in FIG. 9, neutral clutch 22, input coupled clutch 140, and output brake 170 are engaged when transmission 30 is selectively reconfigured into the intermediate shift mode of operation. According to an exemplary embodiment, the intermediate shift mode provides a smooth and robust shifting strategy that functions reliably even in a wide variety of operating conditions, when using various types of oil for the components of transmission 30, and when experiencing valve nonlinearities that may be present in one or more valves of transmission 30. The intermediate shift mode may provide a zero inertia shift through and across two or more overlapping ranges (e.g., the mid range and the high range, etc.). According to the exemplary embodiment shown in FIGS. 7-9, the intermediate shift mode eliminates the need to simultaneously disengage output brake 170 and engage input coupled clutch 140 to shift from the mid range mode to the high range mode, or vice versa. The intermediate shift mode reduces jerking sensations associated with simultaneously disengaging output brake 170 and engaging input coupled clutch 140 to shift from mid range to high range, providing a smoother ride.

During operation, the intermediate shift mode may be used to shift from mid range mode to high range mode or from high range mode to mid range mode. In one embodiment, when shifting between the mid range mode and the high range mode, both input coupled clutch 140 and output brake 170 are engaged for a period of time prior to disengaging input coupled clutch 140 or output brake 170. Transmission 30 may be selectively reconfigured into the intermediate shift mode in response to one or more inputs reaching a predetermined threshold condition, the inputs including a rotational speed of second electromagnetic device 50 and a rotational speed of connecting shaft 36 and/or engine 20. One or more sensors may be positioned to monitor the rotational speed of at least one of engine 20, connecting shaft 36, a portion of second electromagnetic device 50, or still another component. A controller (e.g., controller 210, etc.) may reconfigure transmission 30 into the intermediate shift mode in response to sensing signals provided by the one or more sensors.

Figure 10:
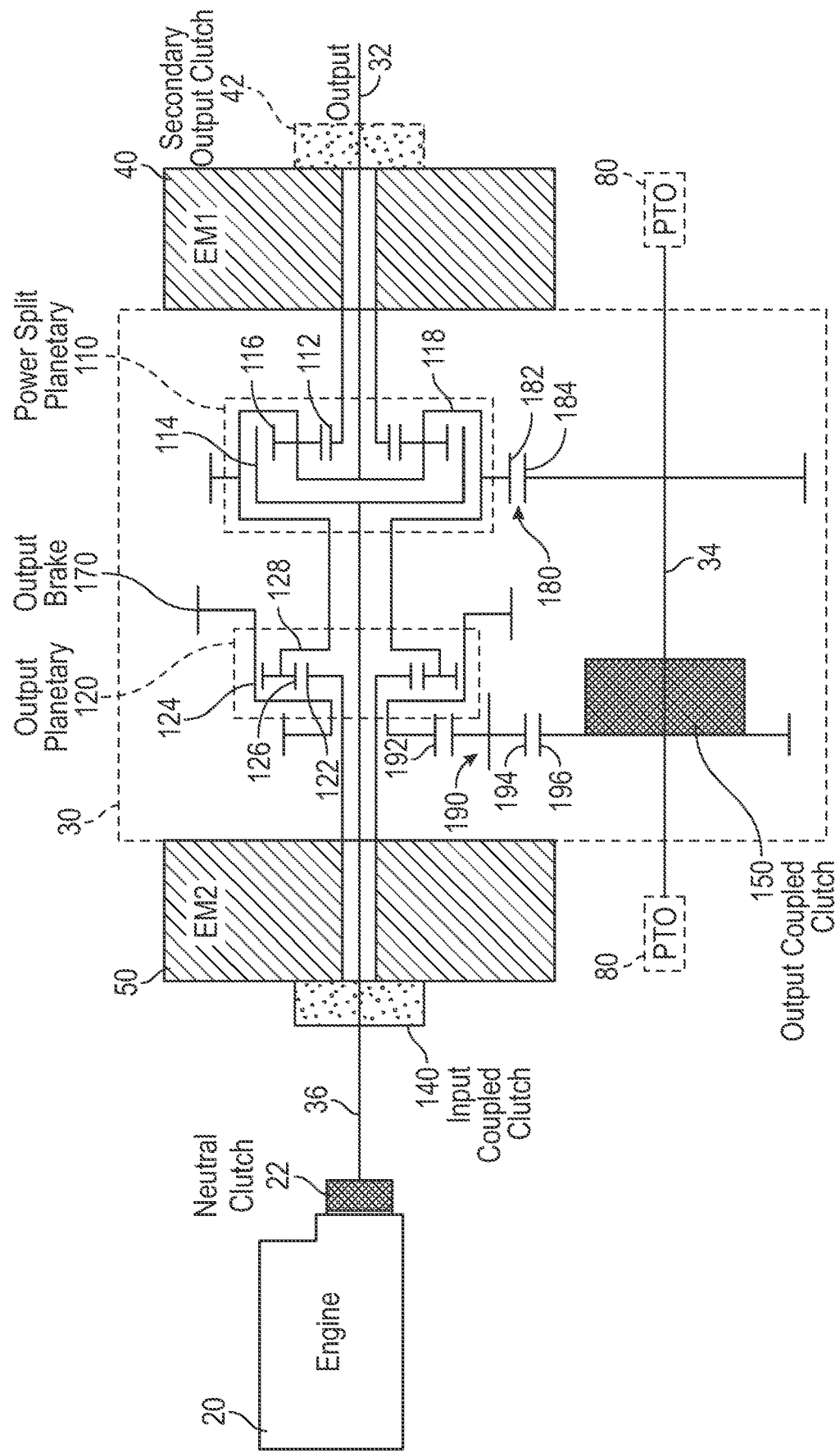
FIG. 10 is a detailed schematic view of a drive train configured in a low speed reverse mode of operation, according to an exemplary embodiment.

As shown in FIG. 10, transmission 30 is selectively reconfigured into a low speed reverse mode of operation. In one embodiment, engine 20 provides a rotational mechanical energy input to transmission 30 such that first electromagnetic device 40 generates electrical power and second electromagnetic device 50 uses the generated electrical power to provide a rotational mechanical energy input to transmission 30. As such, at least one of engine 20 and second electromagnetic device 50 provide rotational mechanical energy to drive at least one of tires 62 and tires 72 in a reverse direction (e.g., backwards, etc.). In an alternative embodiment, first electromagnetic device 40 operates as a motor and second electromagnetic device 50 operates as a generator when transmission 30 is configured in the low range reverse mode.

As shown in FIG. 10 and Table 1, neutral clutch 22 and output coupled clutch 150 are engaged when transmission 30 is configured in the low speed reverse mode. As shown in FIG. 10, the low speed reverse mode is substantially similar to the low range mode of FIG. 6 in that output coupled clutch 150 couples gear set 190 to output shaft 32. In the low speed reverse mode, second electromagnetic device 50 may provide a rotational mechanical energy input to transmission 30 in an opposite direction as compared to the low range mode of FIG. 6.

Figure 11:
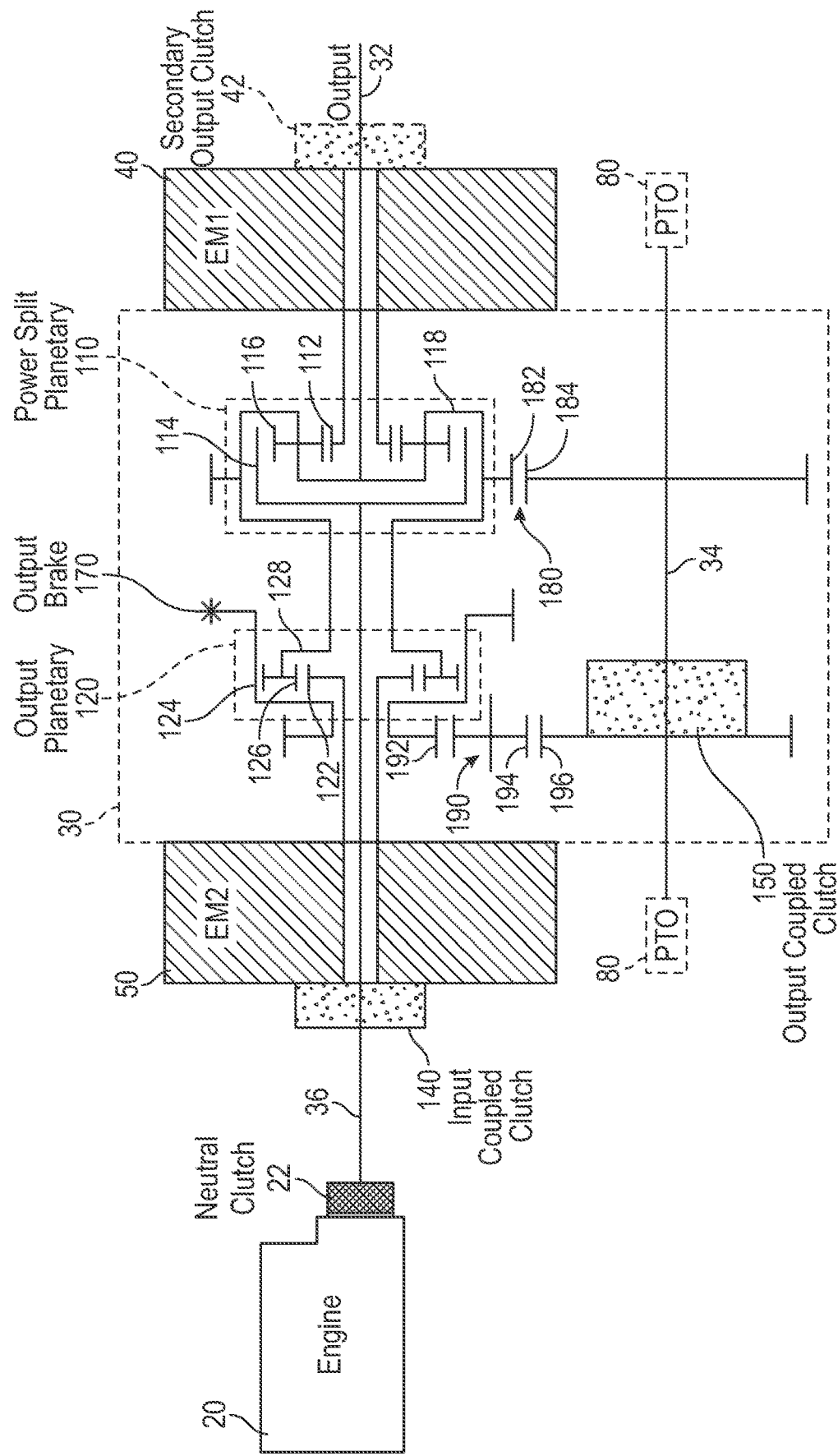
FIG. 11 is a detailed schematic view of a drive train configured in a mid speed reverse mode of operation, according to an exemplary embodiment.

As shown in FIG. 11, transmission 30 is selectively reconfigured into a mid speed reverse mode of operation such that transmission 30 allows for a mid reverse output speed operation. In one embodiment, engine 20 provides a rotational mechanical energy input such that first electromagnetic device 40 generates electrical power, and second electromagnetic device 50 uses the generated electrical power to provide a rotational mechanical energy input to transmission 30. As such, at least one of engine 20 and second electromagnetic device 50 provides a rotational mechanical energy input to drive at least one of tires 62 and tires 72 in a reverse direction (e.g., backwards). In an alternative embodiment, second electromagnetic device 50 operates as a generator and first electromagnetic device 40 operates as a motor when transmission 30 is configured in the mid speed reverse mode. In still another alternative embodiment, both first electromagnetic device 40 and second electromagnetic device 50 operate as a generator in the mid speed reverse mode.

As shown in FIG. 11 and Table 1, neutral clutch 22 and output brake 170 are engaged when transmission 30 is configured in the mid speed reverse mode. As shown in FIG. 11, output brake 170 inhibits the rotation of gear set 190 (e.g., gear 192, gear 194, gear 196, etc.). Output brake 170 thereby rotationally fixes ring gear 124. According to the exemplary embodiment shown in FIG. 11, an energy flow path for the mid speed reverse mode includes: engine 20 providing a rotational mechanical energy input to connecting shaft 36 that is conveyed to ring gear 114; and ring gear 114 driving the plurality of planetary gears 116 to rotate about central axes thereof, as well as about sun gear 112 such that both carrier 118 and sun gear 112 rotate.

Referring still to FIG. 11, the rotation of carrier 118 drives carrier 128, which rotates the plurality of planetary gears 126 about central axes thereof, as well as about sun gear 122. With ring gear 124 fixed by output brake 170, second electromagnetic device 50 may operate as a motor. In one embodiment, second electromagnetic device 50 receives electrical energy generated by first electromagnetic device 40. Accordingly, first electromagnetic device 40 operates as a generator, removing a rotational mechanical energy from sun gear 112. Second electromagnetic device 50 receives electrical energy from first electromagnetic device 40, applying a rotational mechanical torque to sun gear 122. The sun gear 122 conveys the rotational mechanical torque to the plurality of planetary gears 126 such that each further rotates about sun gear 122 (e.g., at an increased rotational speed, etc.). The rotation of the plurality of planetary gears 126 (e.g., effected by sun gear 122, etc.) drives carrier 128 and thereby carrier 118. Carrier 118 drives output shaft 32 at a mid reverse output speed and may thereby drive a vehicle at a mid reverse output speed.

Figure 12:
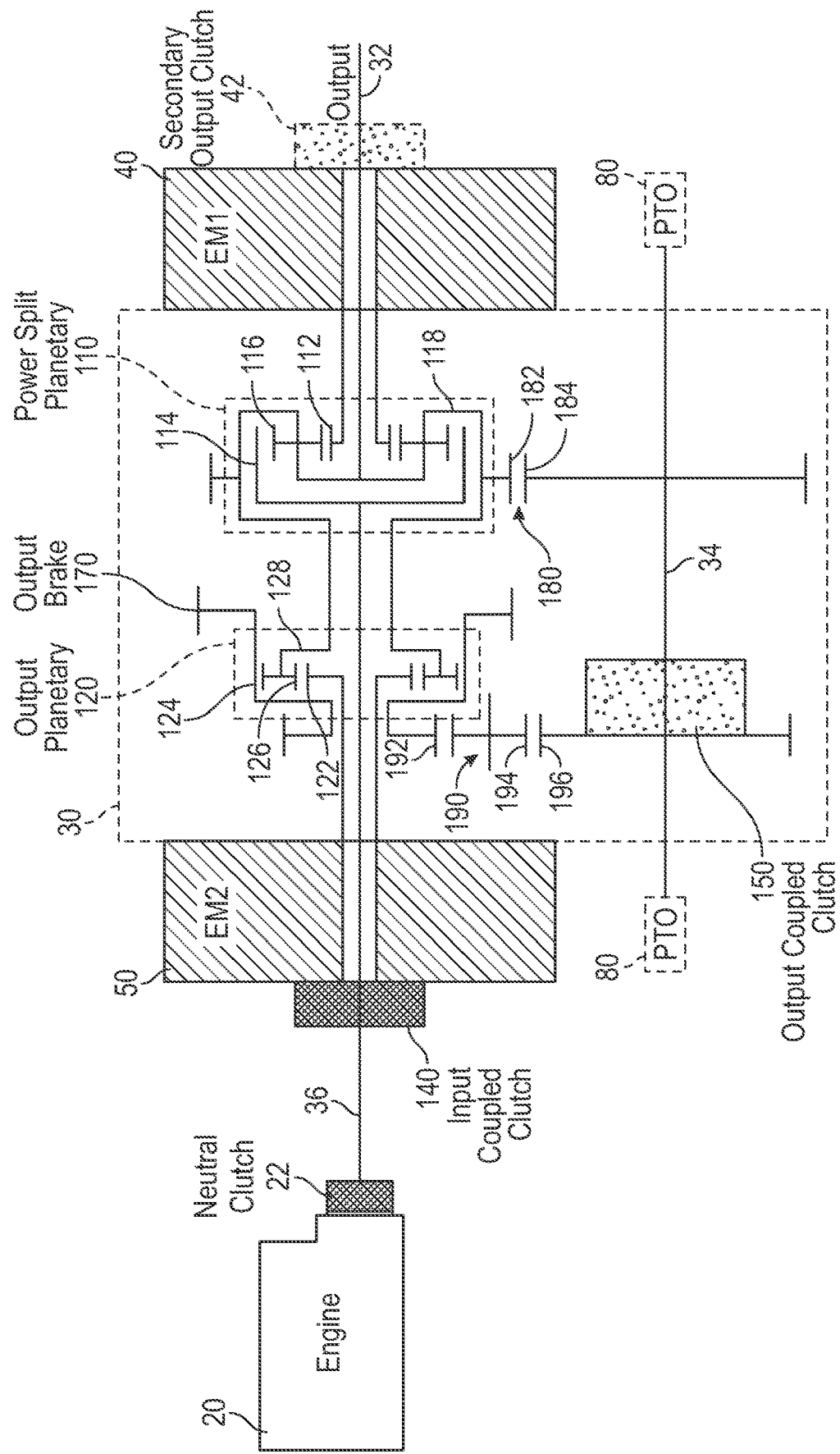
FIG. 12 is a detailed schematic view of a drive train configured in a power generation mode of operation, according to an exemplary embodiment.

As shown in FIG. 12, transmission 30 is selectively reconfigured into a power generation mode such that rotation of connecting shaft 36 rotates first electromagnetic device 40 and second electromagnetic device 50 to generate electrical power. In one embodiment, the electrical power is stored for future use. In another embodiment, the electrical power is used to power internal devices (e.g., control system 200, components of the vehicle, etc.) and/or external devices. As shown in FIG. 12 and Table 1, neutral clutch 22 and input coupled clutch 140 are engaged when transmission 30 is configured in the power generation mode.

According to an exemplary embodiment, engine 20 provides a rotational mechanical energy input to connecting shaft 36, which drives both first electromagnetic device 40 and second electromagnetic device 50. As shown in FIG. 12, second electromagnetic device 50 is rotationally coupled to engine 20 via the engagement of input coupled clutch 140 with connecting shaft 36 such that second electromagnetic device 50 generates electrical power. According to the exemplary embodiment shown in FIG. 12, an energy flow path for the power generation mode includes: connecting shaft 36 provides rotational mechanical energy to ring gear 114 of power split planetary 110; ring gear 114 conveys the rotational mechanical energy from connecting shaft 36 to the plurality of planetary gears 116; the plurality of planetary gears 116 rotate about central axes thereof, thereby transferring rotational mechanical energy to sun gear 112; sun gear 112 provides the rotational mechanical energy from engine 20 to first electromagnetic device 40 via the shaft of first electromagnetic device 40 such that first electromagnetic device 40 generates electrical power. In some embodiments, a brake is applied to front axle 60 and/or rear axle 70 to prevent movement of the vehicle 10 in the power generation mode.

According to an alternative embodiment, engine 20 does not provide a rotational mechanical energy input to drive a vehicle. By way of example, first electromagnetic device 40, second electromagnetic device 50, and/or another device may store energy during the above mentioned modes of operation. When sufficient energy is stored (e.g., above a threshold level, etc.), at least one of first electromagnetic device 40 and second electromagnetic device 50 may provide a rotational mechanical energy output such that the vehicle is driven without an input from engine 20 (e.g., an electric mode, etc.).

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. An electrified vehicle comprising:
a front axle;
a rear axle;
an engine;
a pump;
a battery;
a first electric motor electrically coupled to the battery;

a second electric motor electrically coupled to the battery, the second electric motor configured to drive at least one of the front axle or the rear axle;

a first clutch positioned between the engine and the first electric motor; and a second clutch positioned between the first electric motor and the pump;

wherein, with the first clutch engaged and the second clutch disengaged, the engine is configured to drive the first electric motor to generate electricity to charge the battery;

wherein, with the first clutch disengaged and the second clutch engaged, the first electric motor is configured to drive the pump; and wherein, with the first clutch engaged and the second clutch engaged, the engine is configured to drive the pump.

2. The electrified vehicle of claim 1, further comprising a gearset positioned between the first electric motor and the pump.

3. The electrified vehicle of claim 1, further comprising a gearset positioned between the second electric motor and the at least one of the front axle or the rear axle.

4. The electrified vehicle of claim 1, further comprising:
a first gearset positioned between the first electric motor and the pump; and
a second gearset positioned between the second electric motor and the at least one of the front axle or the rear axle.

5. The electrified vehicle of claim 1, wherein the engine is positioned proximate a rear of the electrified vehicle.

6. An electrified vehicle comprising:
an axle;
an engine;
a pump;
a battery;
a first electric motor electrically coupled to the battery;
a second electric motor electrically coupled to the battery, the second electric motor configured to drive the axle;
a first clutch positioned to couple the engine with the first electric motor;
a second clutch positioned to couple the first electric motor with the pump;
a first gearset positioned between the first electric motor and the pump; and
a second gearset positioned between the second electric motor and the axle;
wherein, with the first clutch engaged and the second clutch engaged, the engine is configured to drive the pump.

7. The electrified vehicle of claim 6, wherein the engine is positioned proximate a rear of the electrified vehicle.

8. The electrified vehicle of claim 6, wherein, with the first clutch engaged and the second clutch disengaged, the engine is configured to drive the first electric motor to generate electricity to charge the battery.

9. The electrified vehicle of claim 6, wherein, with the first clutch disengaged and the second clutch engaged, the first electric motor is configured to drive the pump.

10. The electrified vehicle of claim 6, wherein:
with the first clutch engaged and the second clutch disengaged, the engine is configured to drive the first electric motor to generate electricity to charge the battery; and
with the first clutch disengaged and the second clutch engaged, the first electric motor is configured to drive the pump.

11. An electrified vehicle comprising:
a front axle;
a rear axle;
an engine;
a pump;
a battery;
a first electric motor electrically coupled to the battery;
a second electric motor electrically coupled to the battery, the second electric motor configured to drive at least one of the front axle or the rear axle;
a first clutch positioned between the engine and the first electric motor; and
a second clutch positioned between the first electric motor and the pump;
wherein, with the first clutch engaged and the second clutch disengaged, the engine is configured to drive the first electric motor to generate electricity to charge the battery without driving the pump;
wherein, with the first clutch disengaged and the second clutch engaged, the first electric motor is configured to drive the pump; and
wherein, with the first clutch engaged and the second clutch engaged, the engine is configured to drive the pump.

12. The electrified vehicle of claim 11, further comprising a gearset positioned between the first electric motor and the pump.

13. The electrified vehicle of claim 11, further comprising a gearset positioned between the second electric motor and the at least one of the front axle or the rear axle.

14. The electrified vehicle of claim 11, further comprising:
a first gearset positioned between the first electric motor and the pump; and
a second gearset positioned between the second electric motor and the at least one of the front axle or the rear axle.

15. The electrified vehicle of claim 11, wherein the engine is positioned proximate a rear of the electrified vehicle.

* * * * *